United States Patent
Moncsko et al.

(10) Patent No.: US 7,290,205 B2
(45) Date of Patent: Oct. 30, 2007

(54) SYSTEM AND METHOD FOR MANAGEMENT OF DOCUMENT CROSS-REFERENCE LINKS

(75) Inventors: Cynthia A. Moncsko, Cary, NC (US); Lauren A. B. Bond, Overland Park, KS (US)

(73) Assignee: SAS Institute Inc., Cary, NC (US)

( * ) Notice: Subject to any disclaimer, the term of this patent is extended or adjusted under 35 U.S.C. 154(b) by 280 days.

(21) Appl. No.: 10/874,462

(22) Filed: Jun. 23, 2004

(65) Prior Publication Data

US 2005/0289446 A1    Dec. 29, 2005

(51) Int. Cl.
    *G06F 15/00* (2006.01)
(52) U.S. Cl. .................................... 715/501.1
(58) Field of Classification Search .......... 715/500, 715/501.1, 530, 513
    See application file for complete search history.

(56) References Cited

U.S. PATENT DOCUMENTS

| | | | | |
|---|---|---|---|---|
| 5,822,539 A | * | 10/1998 | van Hoff | 709/236 |
| 5,897,643 A | * | 4/1999 | Matsumoto | 715/511 |
| 5,995,099 A | * | 11/1999 | Horstmann | 715/501.1 |
| 6,049,799 A | | 4/2000 | Mangat et al. | |
| 6,253,204 B1 | | 6/2001 | Glass et al. | 707/102 |
| 6,321,242 B1 | | 11/2001 | Fogg et al. | |
| 6,449,739 B1 | * | 9/2002 | Landan | 714/47 |
| 6,493,731 B1 | * | 12/2002 | Jones et al. | 715/501.1 |
| 6,665,838 B1 | * | 12/2003 | Brown et al. | 715/501.1 |
| 6,889,224 B2 | * | 5/2005 | Smith | 707/10 |
| 7,032,124 B2 | * | 4/2006 | Greenbaum | 714/5 |
| 7,073,121 B2 | * | 7/2006 | Brown et al. | 715/513 |
| 7,076,728 B2 | * | 7/2006 | Davis et al. | 715/513 |
| 7,107,517 B1 | * | 9/2006 | Suzuki et al. | 715/501.1 |
| 2002/0103917 A1 | * | 8/2002 | Kay et al. | 709/229 |
| 2002/0152245 A1 | * | 10/2002 | McCaskey et al. | 707/530 |
| 2003/0023463 A1 | * | 1/2003 | Dombroski et al. | 705/5 |
| 2003/0074350 A1 | * | 4/2003 | Tsuda | 707/3 |
| 2004/0070606 A1 | * | 4/2004 | Yang et al. | 345/745 |
| 2004/0199516 A1 | * | 10/2004 | Thames et al. | 707/100 |
| 2005/0021997 A1 | * | 1/2005 | Beynon et al. | 713/200 |
| 2005/0028080 A1 | * | 2/2005 | Challenger et al. | 715/501.1 |
| 2005/0060682 A1 | * | 3/2005 | Wu et al. | 716/21 |
| 2005/0120292 A1 | * | 6/2005 | Suzuki | 715/501.1 |
| 2005/0251399 A1 | * | 11/2005 | Agarwal et al. | 705/1 |
| 2006/0026083 A1 | * | 2/2006 | Wyle | 705/31 |
| 2006/0174198 A1 | * | 8/2006 | Brown et al. | 715/530 |

OTHER PUBLICATIONS

Haas et al., Page and Link Classifications : Connecting Diverse Resources, ACM 1998, pp. 99-107.*
Yossef et al., Sic Transit Gloria Telae : Towards an Understanding of the Web's Decay, ACM 2004, pp. 328-337.*

(Continued)

*Primary Examiner*—Cong-Lac Huynh
(74) *Attorney, Agent, or Firm*—Jones Day

(57) ABSTRACT

A computer-implemented system and method for handling documents. Data is stored about links between document content. A subset of the document content is defined. If links are identified as broken due to the determination of the document content subset, then the identified broken links are resolved before delivery of the document content subset.

50 Claims, 19 Drawing Sheets

OTHER PUBLICATIONS

Dijkstra, A Model for the Management of Dynamic Web Applications, ACM 2004, pp. 402-408.*

Modha et al., Clustering Hypertext with Applications to Web Searching, ACM 2000, pp. 143-152.*

David, Hypertext Link Integrity, ACM 2000, pp. 1-5.*

Ciancarini et al., XLinkProxy: External Linkbases with XLink, ACM 2002, pp. 57-65.*

Arbottext DCAM Datasheet [http://www.arbortext.com/html/dcam_datasheet.html], 4 pp., printed on Apr. 7, 2004.

"Arbortext DCAM: easier dynamic publishing" [http://www.arbortext.com/html/dcam.html], 1 pg., printed on Apr. 7, 2004.

"Features and Benefits—AuthorIT—Affordable Single Source Content Management" [http://www.author-it.com/features.mv], 5 pp., printed on Apr. 7, 2004.

"AuthorIT—Affordable Single Source Content Management" [http://www.author-it.com], 1 pg., printed on Apr. 7, 2004.

Arbortext, "Application Session Track" [http://www.arbortext.com/html/application_session_track.html], 9 pp., printed on Apr. 7, 2004.

IBM Authoring Tools, DITA Language Reference, Release 12, First Edition, May 2003.

* cited by examiner

SYSTEM AND METHOD FOR MANAGEMENT OF DOCUMENT CROSS-REFERENCE LINKS

TECHNICAL FIELD

The present invention relates generally to computer-implemented handling of document content and more particularly to handling document cross-references.

BACKGROUND

Online documentation has gained popularity and acceptance as the world wide web and the Internet has become a regular part of business life. In business settings, online documentation is expected and utilized for many purposes, such as for providing information about a software product. Online documentation is expected to include links (e.g., hyperlinks) among various document content to enhance the reader's experience with the material. Because document cross-reference links are typically required in the online documentation, such links have become part of the documentation development process.

Creation and management of a large quantity of cross-reference links are particularly challenging at least in part because links are tightly related to document content, and typically the content is constantly changing. Current link management approaches are inefficient in handling links among multiple documents or document parts, and accordingly improvements are needed.

SUMMARY

In accordance with the teachings provided herein, systems and methods are provided for handling documents. As an example of a system and method, data is stored in a database about links between document content. A subset of the document content is defined. If links are identified as broken due to the determination of the document content subset, then the identified broken links are resolved before delivery of the document content subset.

DETAILED DESCRIPTION

Figure 1:
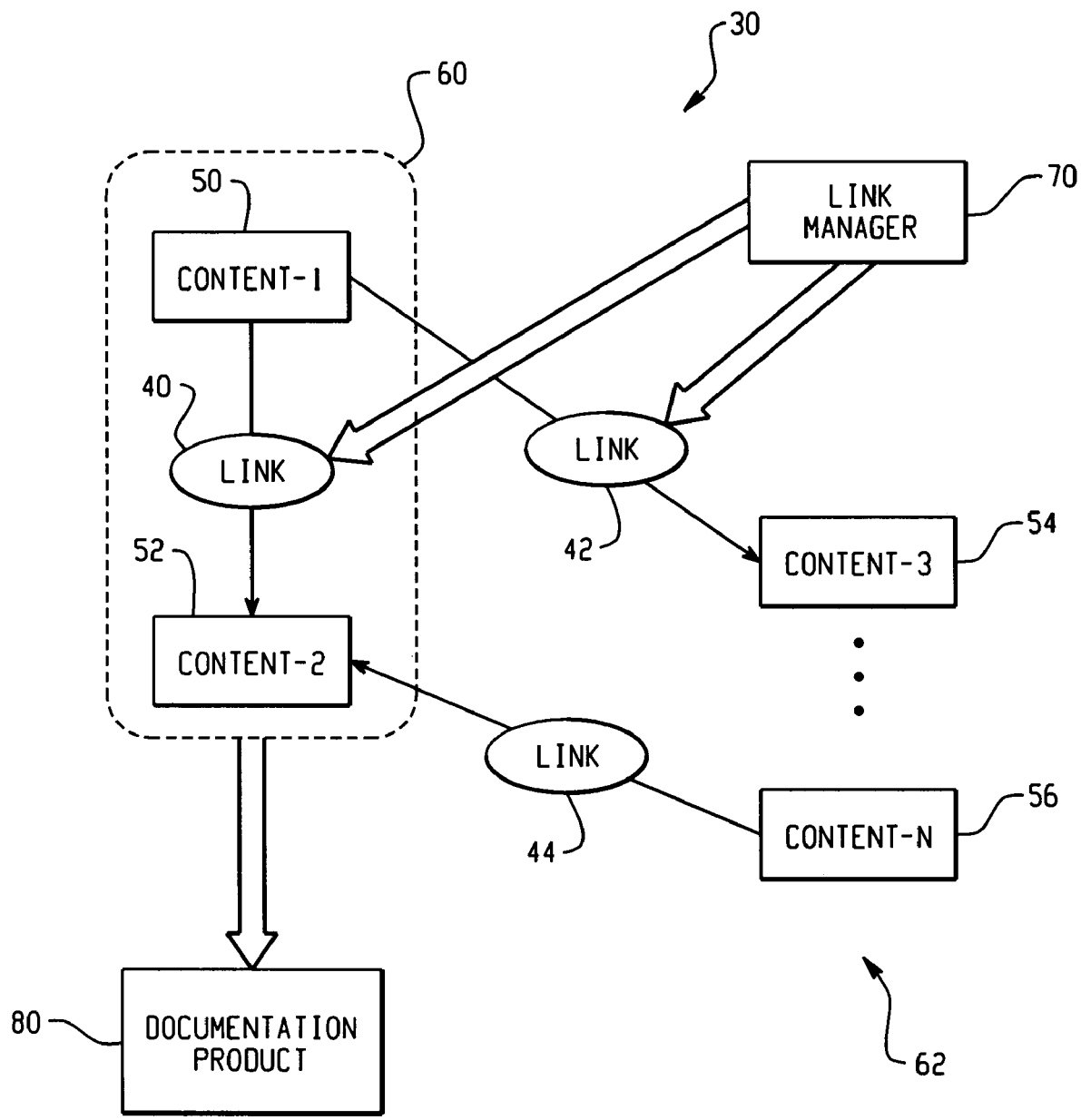
FIG. 1 is a block diagram depicting a system for managing cross-reference links among documents.

FIG. 1 depicts a system 30 for managing cross-reference links (40, 42, 44) among content (50, 52, 54, 56) of one or more documents. The system 30 manages the links (40, 42, 44) associated with the document content (50, 52, 54, 56) even though the links may be tightly related to document content that is constantly changing. For example, if a subset 60 of the document content library 62 is produced at a given time, it is possible for a link (e.g., link 42) to have its source location 50 in the set 60 of documents being produced, and the target location 54 outside of the subset 60. This would result in a broken link (e.g., link 42 referencing a missing document). A link manager 70 is used to identify and remove such links, thereby preventing an invalid link (e.g., link 42) from reaching the final documentation product 80.

Accordingly, a reader of the documentation 80 will not click on a hyperlink in online documentation and get a "page not found" error. In a print book, the reader will not be referenced to a book that is inappropriate for the reader. When a user follows a link or reference, the expected information will be found at the destination.

The system 30 can be used in many environments, such as in the development and management of large documentation products. Typically, organizations that produce such documentation exist in corporate technical writing divisions, government, publishing companies, and large research organizations. In organizations of considerable size such as these, the documentation development process is characterized by projects involving many writers, editors, and documentation production specialists, and reliance on computer technology in all or most phases of the process.

In the example of a large documentation product environment, a writer may establish a cross-reference hyperlink that acts as a connection between related units of information, such as a definition of a term, or a reference to more detail. Cross-reference hyperlinks are created by a writer while working on the content or are established automatically, such as in a table of contents or index. Cross-reference hyperlinks can include a starting point ("source"), an ending point, ("target") and a direction. Cross-reference hyperlinks could also be bi-directional.

Figure 2:
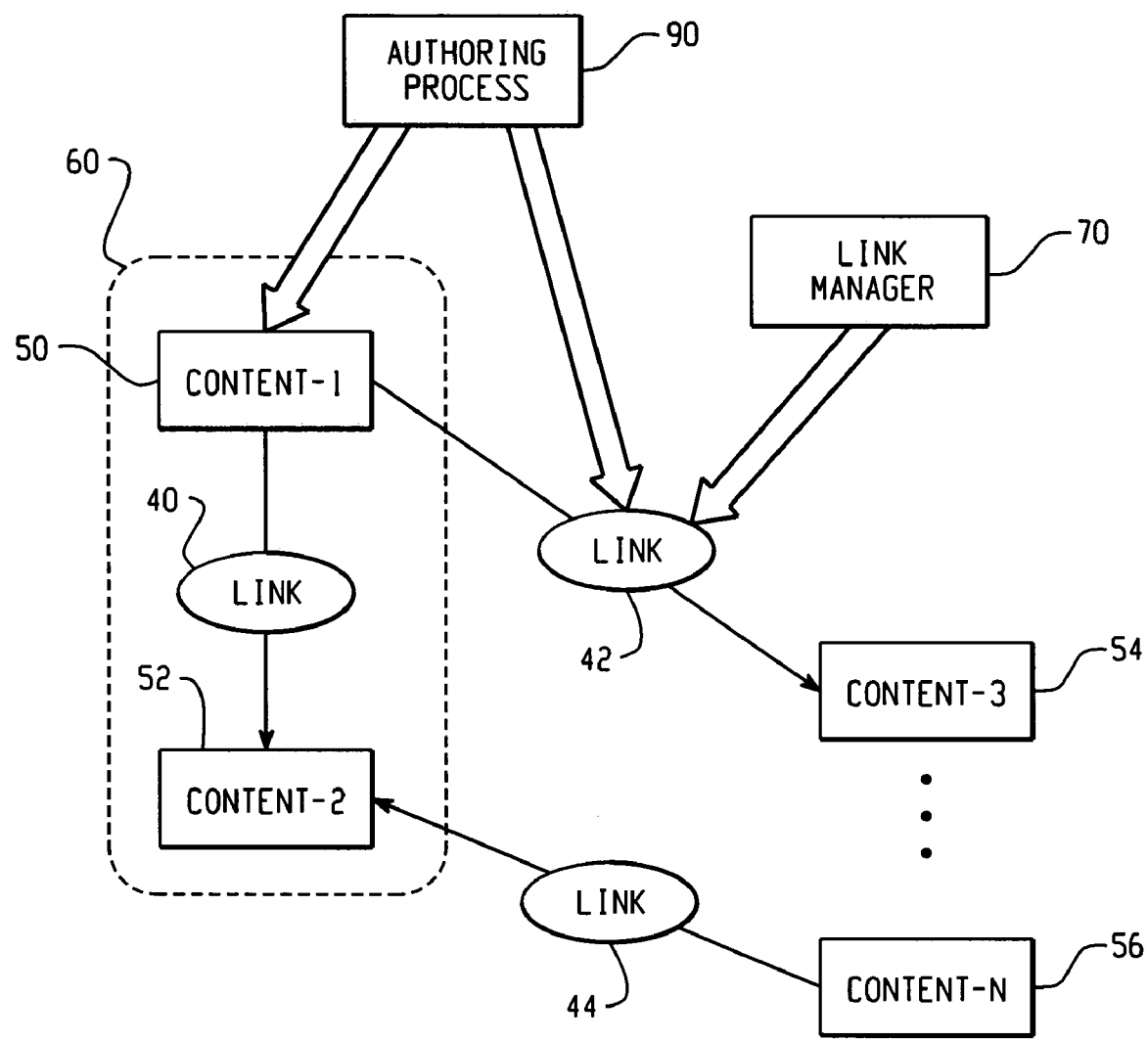
FIGS. 2-4 are block diagrams depicting link managers being used with a document content authoring process.

To handle the links, link manager 70 may be involved in a portion of the documentation development process or throughout the entire documentation development process. As illustrated in FIG. 2, a link manager 70 may be involved during the document content authoring process 90. The authoring process 90 is a phase in the documentation development process in which new content is created or existing content is updated and modified. Creating links takes place during authoring.

During the authoring step 90, a link manager 70 can be used to detect which links are impacted by an editing change to the text in a document content portion or module. Then, it can react appropriately: either by automatically adjusting the link to account for the change, or by informing a user of a problem with links due to the editing change. Links may also be edited separately. When the final documentation product needs to be produced, the system 30 can be configured to interpret the structure of the document in context of its document collection (also known as a product grouping), to ensure that all links will be valid in the documentation product. When ambiguities are detected in links during document resolution, the system can notify the user and provide a set of choices to address the ambiguity. It can also be configured to automatically detect invalid links and remove them.

Figure 3:
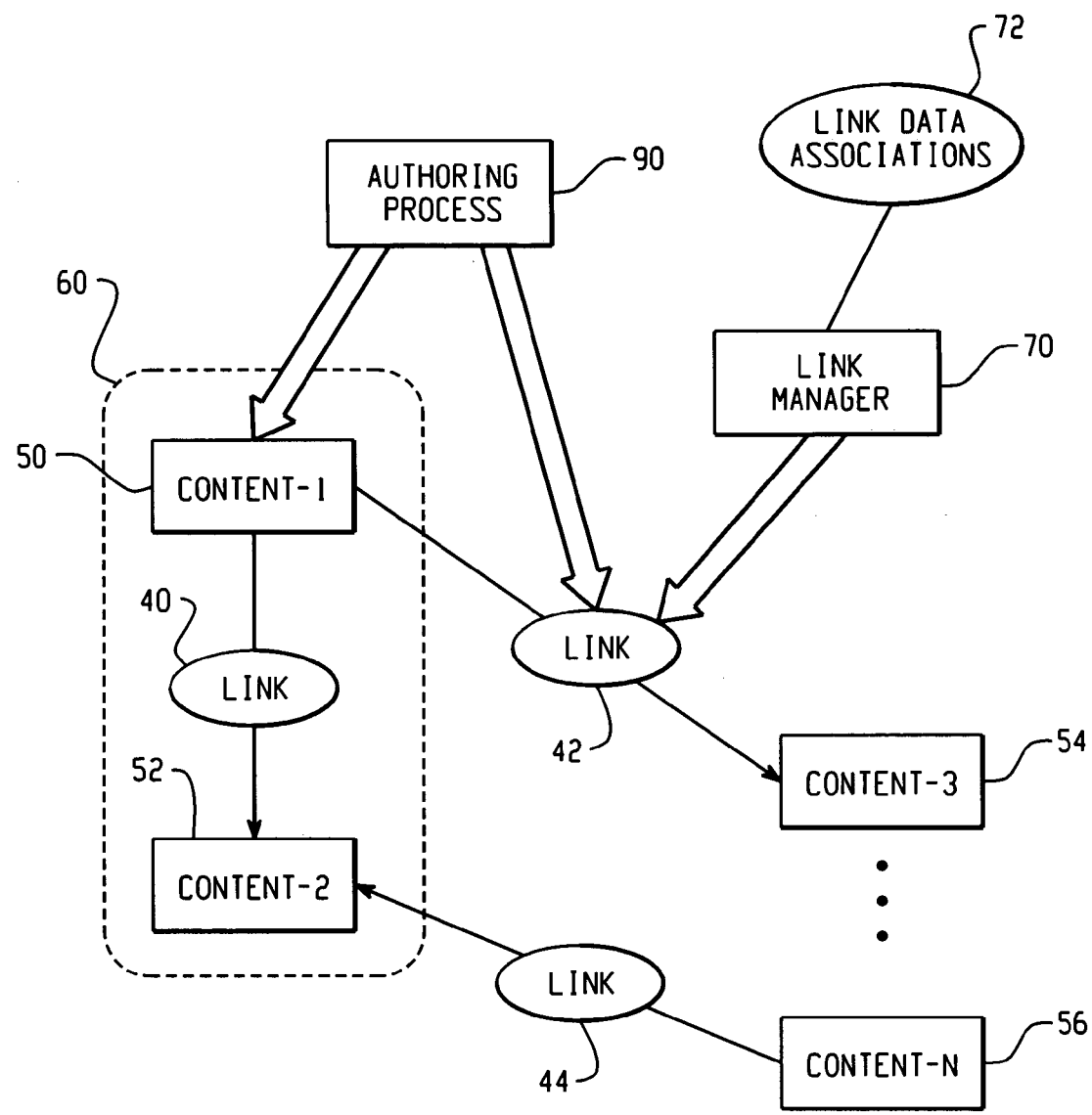
Figure 4:
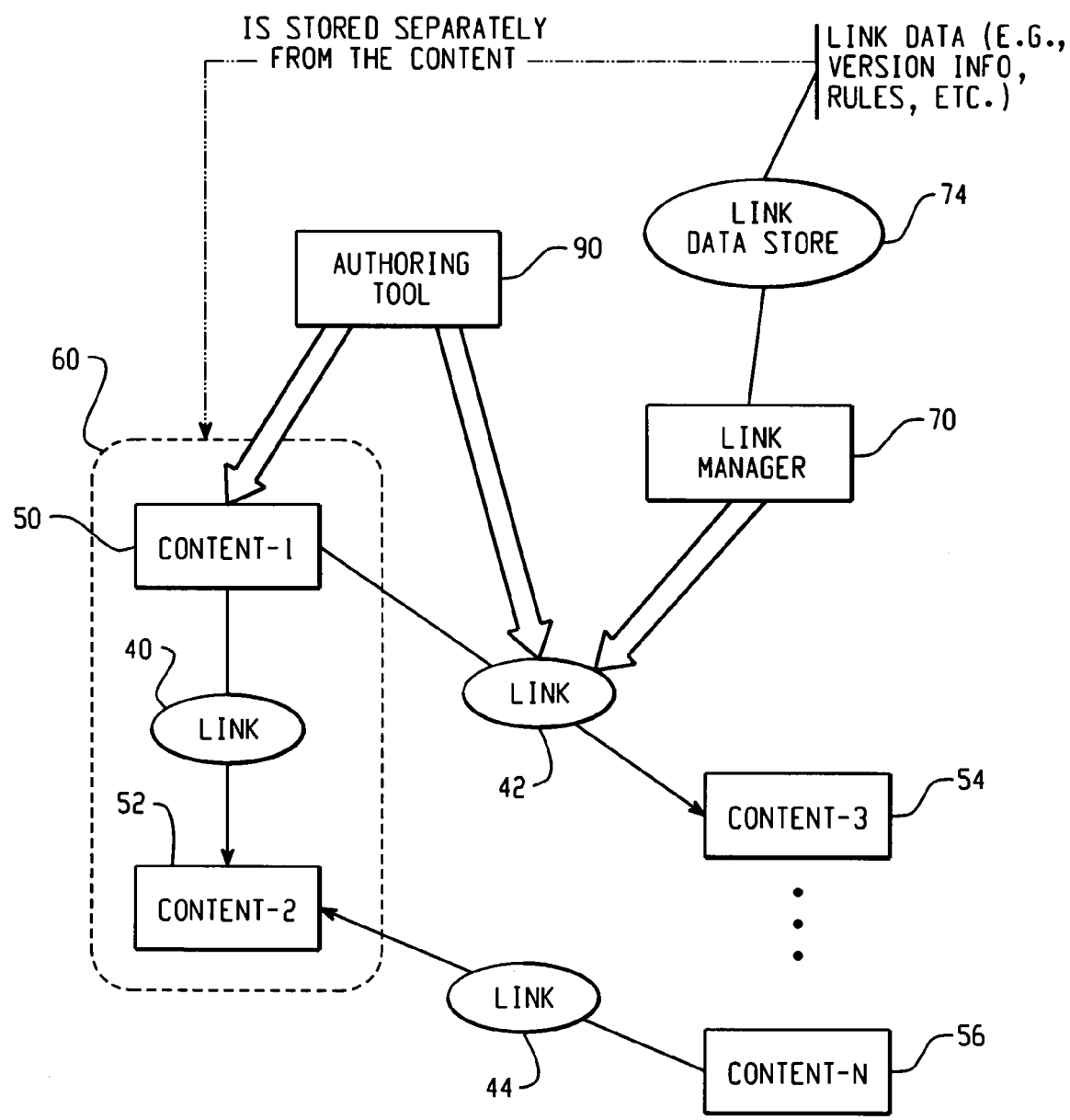

Link managers may be configured differently depending upon the situation at hand. As an illustration, FIG. 3 shows a link manager 70 utilizing link data association(s) 72 that contain link information about which links exist among the document content. The link association(s) 72 can be configured such that links are stored and managed as unique entities. FIG. 4 shows a configuration wherein the link information is stored separately in a link data store 74 from the document content (50, 52, 54, 56). The document content (50, 52, 54, 56) may still contain, if so desired, link information, but link information is also stored separately for access by a link manager 70, such as, but not limited to, in a different location on a server or on a separate server.

The link data store 74 may be augmented in different ways. One augmentation includes storage of information in the link data store regarding document content version and which links are applicable to which version. This allows a link manager 70 to remove confusion about which instance of a section is the correct reference in a link if a document section (e.g., a paragraph) was reused several times in a document collection.

As another illustration of an augmentation to a link data store 74, the link data store 74 may allow definition of rules for creating links. The rules can be based on one or more factors, such as document structure as revealed in the markup of the text, the role of the link, etc. For example, a rule could be established that requires all links with a source location of a "glossary term" to have a target location of a "glossary definition," and its link role is "glossary link." A link manager 70 can be configured to periodically access the link data store 74 in order to recheck the validity of existing links to the rules, so that when a rule changes, links that violate the new rule are detected.

Figure 5:
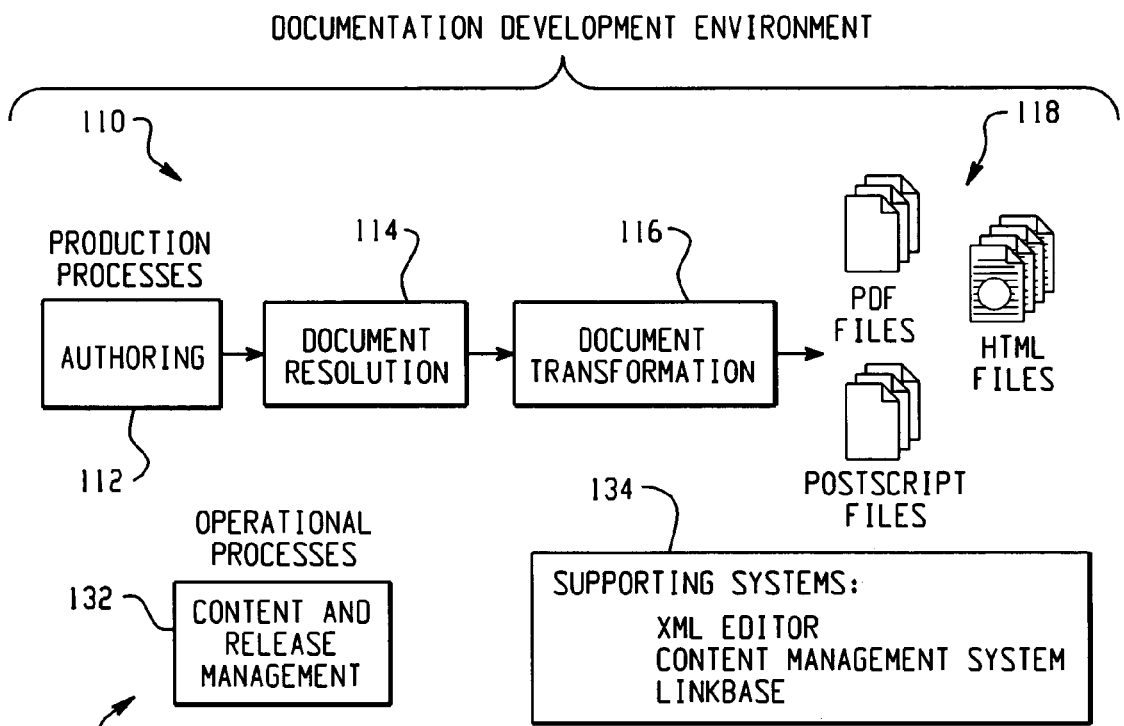
FIG. 5 is a block diagram depicting an example of a documentation development environment.

FIG. 5 provides an illustration of an environment for developing documentation wherein the environment involves production processes 110 and operational processes 130. Production processes 110 generate documentation. This process 110 starts with the authoring phase 112, which is the process of developing content. During authoring 112, individuals write new documentation modules from scratch and edit existing modules. The next step is document resolution 114, in which the content is prepared for delivery. During this phase 114, the document collections are defined, and complete module sets are gathered for documents.

The third phase 116 is document transformation, which translates the internal representation of the complete document to the desired output format 118. For example, document transformation 116 can deliver documentation in many formats 118. The formats can be paper documentation, like books and manuals, or a collection of HTML pages for use with a web browser. Other formats may be required for the same material, such as PostScript®, and PDF (Portable Document Format). Through use of the techniques disclosed herein, the production processes 110 result in links that "work" in the final document product 118.

Operational processes 130 establish and maintain software tools for use in the production process 110. These procedures can occur at the same time as the production process, but typically do not directly involve creating, editing, or producing documents. For example, content and release management processes 132 support the business of documentation project management. Additionally, tools 134 used for documentation development are maintained, monitored, and upgraded on their own schedules.

It is noted that the steps may occur in the sequence shown in FIG. 5, but also could occur differently, such as all phases of the process taking place simultaneously for different projects. It should be understood that similar to the other processing flows described herein, the steps and the order of the steps in the flowchart described herein may be altered, modified, deleted, and/or augmented and still achieve the desired outcome.

Figure 6:
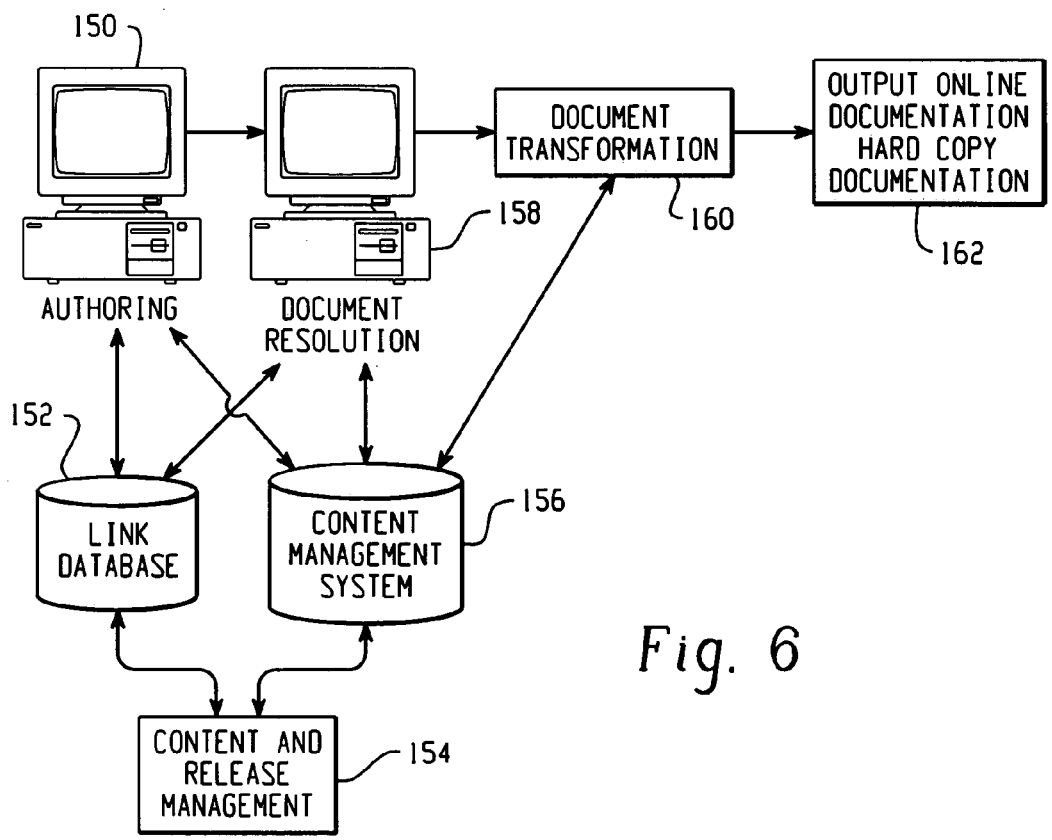
FIG. 6 is a block diagram depicting life cycle management of cross-reference links for document production processes.

FIG. 6 illustrates different components that may participate in document production and which allow document content modular writing. Document content modular writing is a technique in which "modules" are the unit of internal organization for work products that comprise a document. Generally, modules contain text, but individual modules may also contain graphical information, such as figures, graphs, diagrams. A module can represent a unique topic or idea, and a module can be designed to be context-independent which enables the module to be used in many documents, wherever the information in that module is needed. Modular writing enables the organization to reuse modules, rather than recreate the same content in different documents.

A module may be a unit of XML (eXtensible Markup Language) content, typically containing a complete idea or concept. It may be a fluid concept, and a module may be very succinct (e.g., a definition of a term) or very large (e.g., an entire book). In this example, the module is the unit of content manipulated by the content management system 156. The content management system 156 usually defines modules using XML tags, and this can be configurable. (It should be understood that approaches other than XML may be used.) Content modules may also include media files, metadata, links, and data in a database.

Modules may include other modules to form composites. For example, a "chapter" module may include three or four topic modules, which in turn may include definition modules, example modules, etc. Any particular module may be included in an arbitrary number of other modules.

A document can be considered the largest module, usually representing a whole concept area (e.g., a book). Documents contain hundreds of other modules, and they may include the same module several times.

A document production system can include two related domains: the content domain and the deliverable domain. They are useful in defining the scope in which the software can complete its tasks. The content domain is an environment in which modules are developed and maintained. The deliverable domain is an environment in which subsets of content from the content domain are prepared for delivery of documentation product 162.

Links are established among the different modules. A link may include a relationship between two locations within a domain of documentation. In this example, a location is a specific markup tag and its content. The markup schema or document type definition (DTD) can be constructed to provide the "granularity" that is desired. For example, if a sentence is to be the target of a link, then that sentence is identified as a location, and therefore is enclosed in markup tags. If a specific word is the source of a link, then that word is enclosed in markup tags, which designates it as a location.

Because the link is a relationship between two locations, it may not be directly related to the method of rendering the link in the documentation product. For example, an entire chapter may be defined as a link source. However, this does not necessarily mean that all of the text of the chapter will appear as blue underscored text in a web page. The document transformation process determines how to manifest the link in the target medium based on its own rules. In this example, document transformation might place the title of the target location at the very end of the chapter for the "clickable text" in a web page.

A link is an identifiable object, and can have its own attributes. The attributes can be stored separately for access by a link manager program. The attributes characterize the relationship between the source content and the target content. Attributes can include: the specification of the source location; the specification of the target location; and the specification of its role.

Different kinds of links may be used. A first type of link can be a content link, and its source and target locations can be defined within the content domain. A content link has attributes, such as the following that enable effective use in the content domain (e.g., during authoring):

Link title: text that suggests what text will be used in the link during documentation production.

Link state: indication of the validity of this link within the content domain.

Tag name of both source and target locations: the markup tag name of each location.

Another type may be a deliverable link which is a link in the deliverable domain—the source and target locations exist only within the deliverable domain. The attributes on the deliverable link may be as follows:

Link title: text that specifies the text to be used in the rendered link.

Link description: a user-specified value to describe the link.

Multiple levels of unique identification can be used. First, each documentation module may be identified uniquely over the entire domain of the documentation development system, and this identification can be persistent. This may be accomplished using a content management system 156 that also requires unique identifiers. A module identifier is typically a random or sequential alpha numeric value. As an illustration, a module could be identified by a unique alpha numeric value.

Second, each markup tag that can be used as a location has an identifier. When using XML, for example, the tag identifier can be implemented as a specific attribute on the tag, with the identifier value as the value of this attribute. This identifier is unique within the module.

As mentioned above, the content domain is the environment in which modules are developed and maintained. This is the domain of the authoring step 150 in the documentation development process illustrated in FIG. 6. This domain may be characterized by access to the organization's entire or a portion of the documentation resources. Not only are individual modules defined in this domain, but also definitions of documentation products, such as books, are defined.

As shown in FIG. 6, the authoring process 150 is the phase in the documentation development process in which new content is created or existing content is updated and modified. Creating links takes place during authoring. The system shown in FIG. 6 facilitates the management of a potentially large number of links. It is designed for the people who create and edit links. The example shown in FIG. 6 uses three supporting systems: XML authoring software, a content management system 156, and a link storage system or linkbase 152. These supporting systems can be independent, and a link manager can coordinate their activities.

Markup language can be used in the authoring process 150 and is a technique for including meta-information about text within text. Most people are familiar with the markup language of the World Wide Web, HTML (Hypertext Markup Language). Several other markup languages exist, including SGML (Standardized General Markup Language) and XML. The use of a markup language manifests the structure and content of each module. It also provides a means to identify specific fragments of text (e.g., individual sentences or words) within modules. Markup language also provides a way to store content in a way that is independent of any specific documentation delivery format, such as HTML, PostScript, or PDF (Portable Document Format).

The document resolution step 158 is the process that migrates a set of documentation products from the content domain to the deliverable domain. The following step, document transformation 160, takes place in this domain. This environment can be considered a group of document collections, each representing a particular suite of documentation products created at a particular time.

Different components can be used to assist in the document production process. For example, a link database 152 can be utilized as a data component of the system. The link database 152 is the externalization of cross-reference links, that is, links are not stored within the XML document, rather they exist in an independent repository.

The system for this example uses a technique for specifying locations within individual document modules, a data model for encapsulating and storing links persistently, the link database, and the APIs (Application Programming Interfaces) for allowing system components to utilize linking capabilities. External storage 152 of the links and the link data model help the system to search for, detect, and automatically resolve problems with links in every other component. However, it should be understood that one or more components can be omitted and still achieve the desired functionality.

To help ensure that the links are high quality, the link database 152 can include a rules subsystem to govern the definition of links in the content domain. The rules define the set of valid relationships based on the source location, target location, and link role. Rules are defined, and whenever a new link is created, its source, target, and link role are validated against the rules.

A rule can be structured in different ways, such as being made up of the following components: a source tag name, a target tag name, and a role. For example, a rule may be defined as follows: (paragraph, chapter, xref), meaning that if a "paragraph" tag is the source location of a link, then its target location must be a "chapter" and its link role must be "xref." Any of these components may be a wildcard, which is interpreted to mean "any valid value." For example, a rule (<wildcard>, definition, <wildcard>) states that a "definition" tag is a valid target location tag, for any link with a valid source location tag and link role.

The document resolution process 158 prepares the cross-reference links defined with the XML document modules for document transformation. The system migrates the cross-reference links defined among modules to an intermediate format that is specific to the set of documents being produced. This can be an automatic or a semi-automatic process guided by an expert user. The system performs as much of the migration as it can and may accept input from the user to resolve ambiguities, such as multiple potential link targets. The system enables the user to review each ambiguous situation and to resolve the problem. The system retains the resolution between iterations of the process, further automating it. This is also called the link finalization process.

Document transformation 160 is the process of converting the content from its internal representation to an output format suitable for users, such as HTML, XML, or format for printing (hard copy). Each cross-reference link utilized in the output document is extracted from the link database 152 and translated to the format that is appropriate for the desired output medium. For example, a link may be translated into an <a href=" . . . "> tag in HTML, or the phrase "See also Chapter 1—Introduction" in a printed book.

Figure 7A:
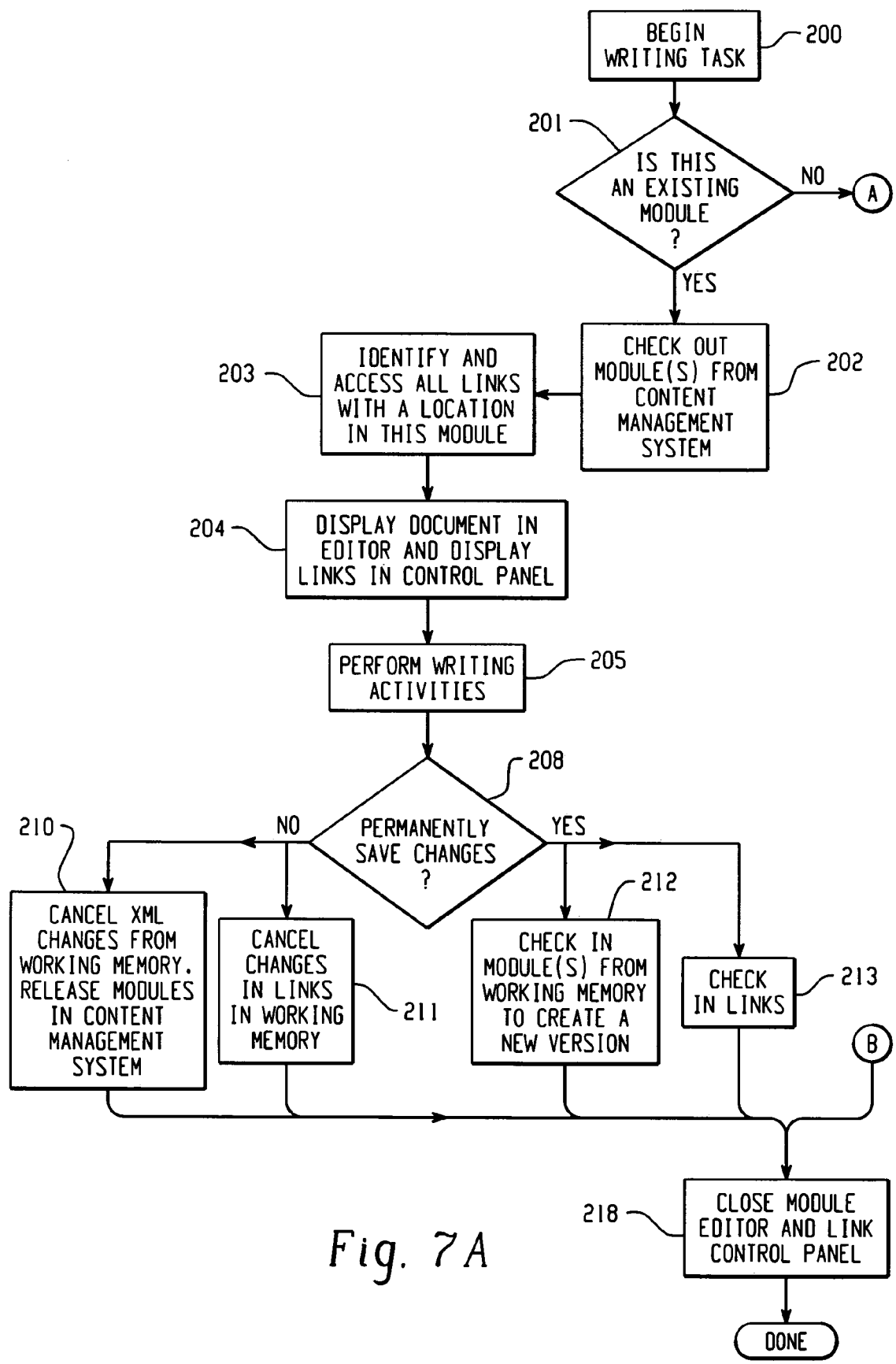
FIGS. 7A and 7B are flow charts depicting an operational scenario for authoring document content.
Figure 7B:
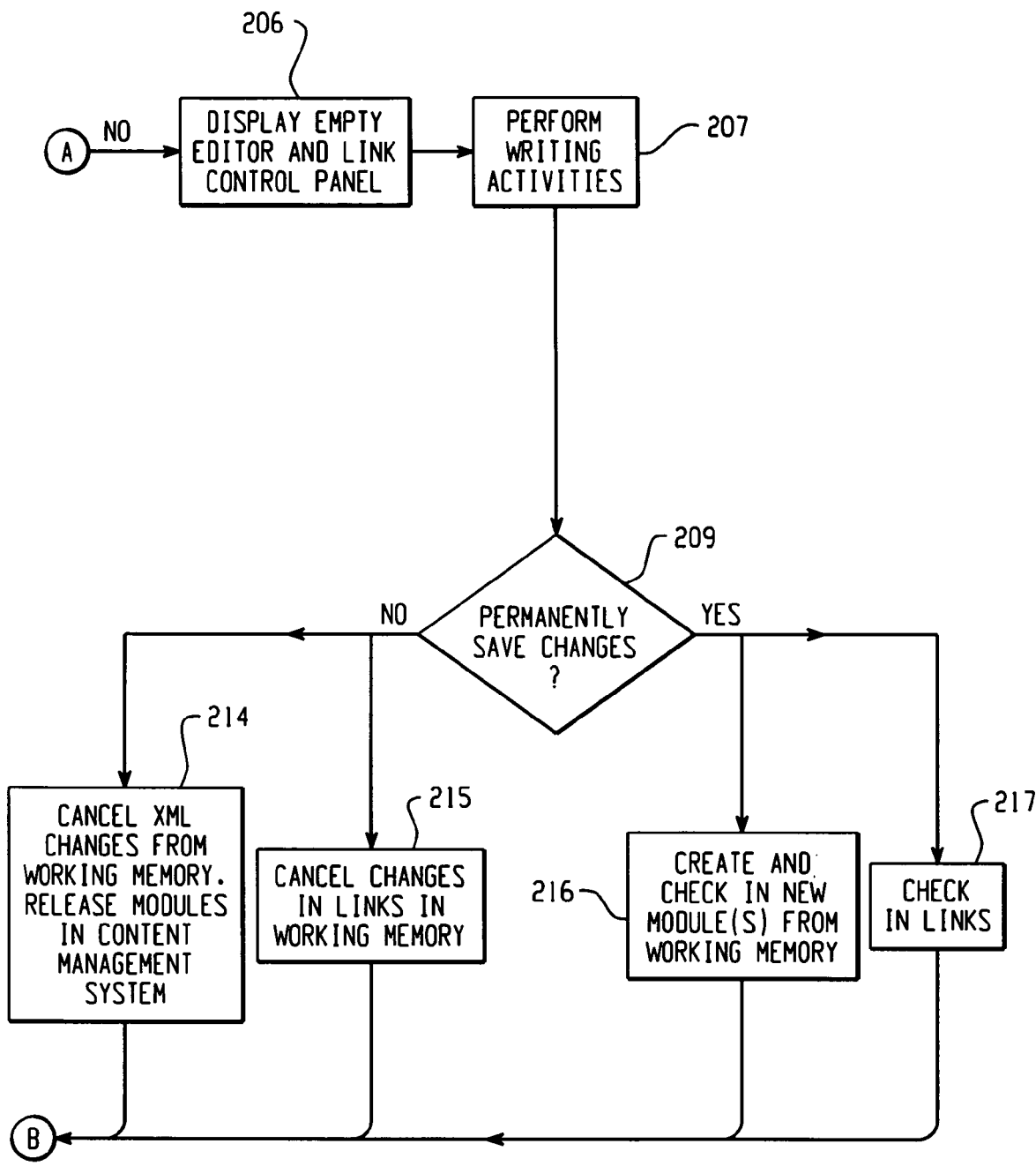

FIGS. 7A and 7B depict an operational scenario for authoring activities beginning when the user initiates a writing task (200). The user decides whether to work on one or more existing modules, or to create a new module (201). If it is an existing module, the user "checks it out" from the content management system, which permits editing changes to be made (202). The check out action locks the XML modules such that no other user can modify them or allows synchronous check outs with a merge process on check in. When the merge process detects a conflict between what was checked in by another user and what is to be checked in by the current user, it allows the current user to view the differences and merge the two sets of changes. The user may check out a larger module than required, for example, by checking out an entire "chapter" when only one or two paragraphs are to be modified. When existing modules are accessed, the links that are related to these modules are simultaneously accessed and brought into the system's working memory (203). The editor window opens containing the modules, and the link control panel displays (204).

If it is a new module, the user bypasses the content management system and starts with an empty editor (206).

Next, the user performs the desired writing activities (205, 207). Actions permitted by an XML editor may include activities, such as keyboard input (typing), copying, pasting, cutting, deleting, etc. These actions may impact links. While these actions are taking place, the changes can be retained in "working" memory. They are not stored permanently in the content management system or the link database until the user explicitly performs a check in or cancel action unless otherwise configured. The user may also choose to work directly with the links through the Link Control Panel (221).

When the user is finished working on the content, either a "check in" or a "cancel" action is performed (208, 209). The check in action permanently stores the XML content in the content management system and stores the links in the link database. If the modified content involves one or more existing modules, a new version of each module is created in the content management system and the content management system removes the lock on the modules or there can be a merge of new content (212). The links are stored in the link database, after a merge step if needed, thereby in this example overwriting any existing links that had been changed (213). If there are one or more new modules in working memory, a new module is created in the content management system (216), and the new links are added to the link database (217). The cancel action ignores the changes in both the XML modules and the links, so neither the XML content nor the links are changed in the content management system and link database (210, 211, 214, 215). If one or more modules had been checked out when the cancel action is issued and if needed, the locks in the content management system can be removed (210).

Figure 8:
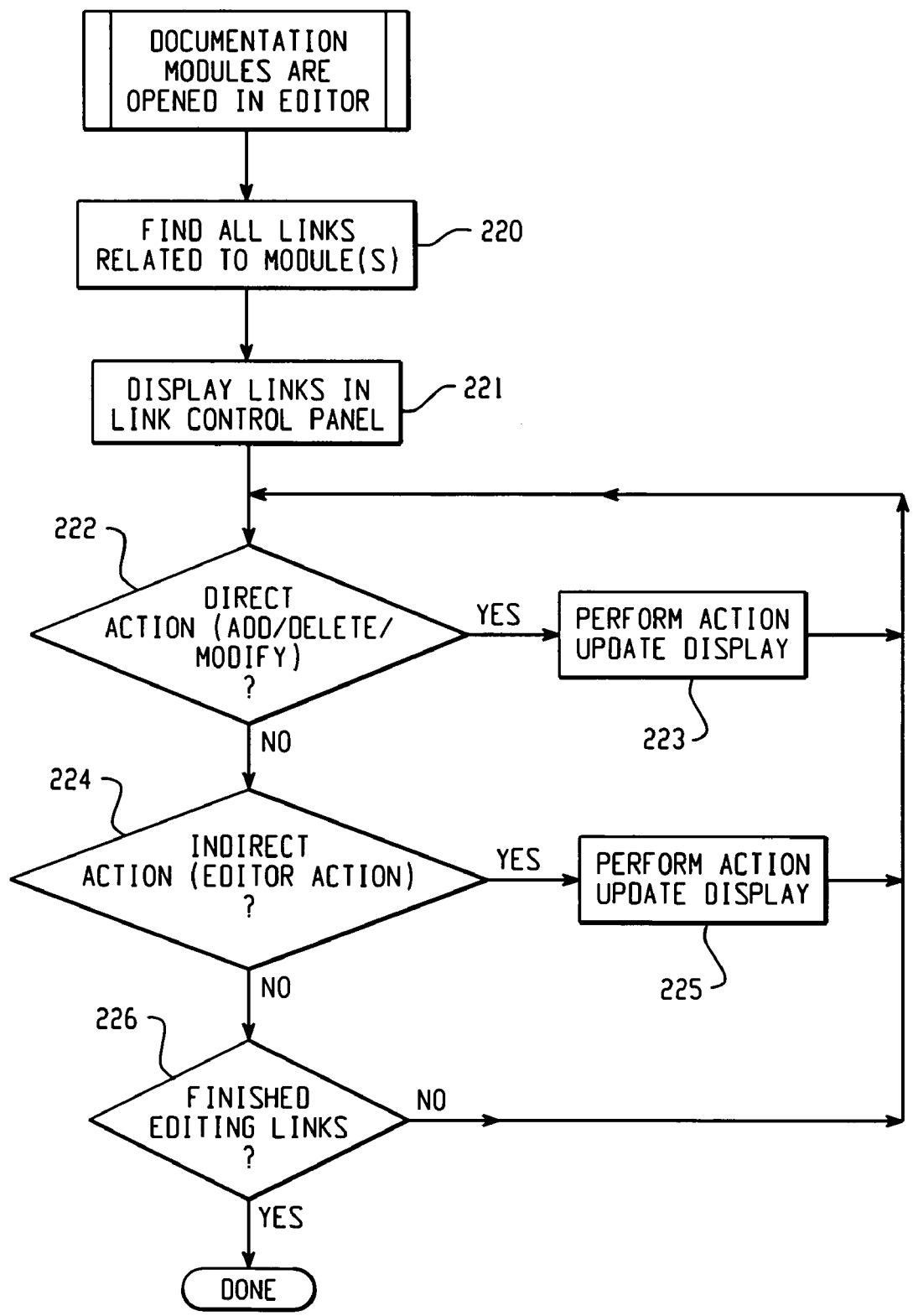
FIG. 8 is a flow chart depicting an operational scenario involving link control panel actions.

FIG. 8 shows additional information for steps 204 and 206 of FIGS. 7A and 7B by illustrating how a control panel may be populated with links and how the user can interact with the control panel. After the modules are retrieved from the content management system, and the entire set of modules is known, the link database is queried for all links related to any of the modules (220). There may be zero to many links. The links are displayed in the control panel (221), which allows the user to view and manipulate the links directly. If the user performs a direct action (add, delete, or modify a link in the control panel) (222), the action is performed on the link in working memory, and the link control panel display is updated to reflect the change (223).

However, it is possible that actions in the XML editor window indirectly alter links. The action is detected (224), and the link control panel is updated to reflect the changes (225).

Completion of editing the links (226) is signaled when the user completes the editing session with either a check in action or a cancel action. To allow the user to view and manipulate the links that are pertinent to the XML modules displayed in the editor, links are displayed in a link control panel user interface.

FIGS. 9-12 are graphical user interfaces depicting examples of link control panel user interfaces when links are to be finalized. Link finalization allows for the migration of links from the authoring context to the deliverable context. The process helps ensure that only valid links are migrated. During this process, all links that contain a source or target resource (or both) in any module in the document are examined for problems or ambiguities.

Figure 9:
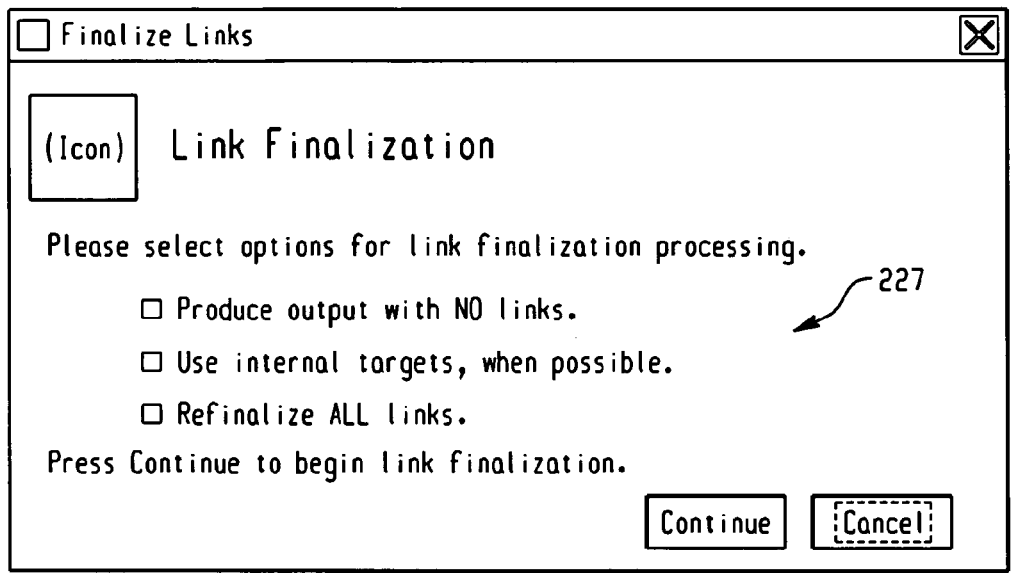
FIGS. 9-12 are graphical user interfaces depicting examples of link control panels.

The link finalization process may be completely automatic, with broken links and ambiguities resolved according to a pre-specified default behavior configuration. User interfaces assist the user to determine how link finalization should be performed. FIG. 9 shows an example at 227 of link finalization options. A user can select different options for determining how the link finalization processing should occur. For example, the user may selection an option to produce output with no links, which can be useful in such situations as previewing the look and feel of HTML output without the overhead of link processing. Another option may include using internal targets when possible, which can be useful in such situations as reducing the number of decisions for the user. As another example of the many different options which can be available to a user, the user may select to refinalize all links, which can be useful in such situations as when the content has changed enough that the deliverable link decisions are to be redone. The user selects the continue button to begin the link finalization process.

Figure 10:
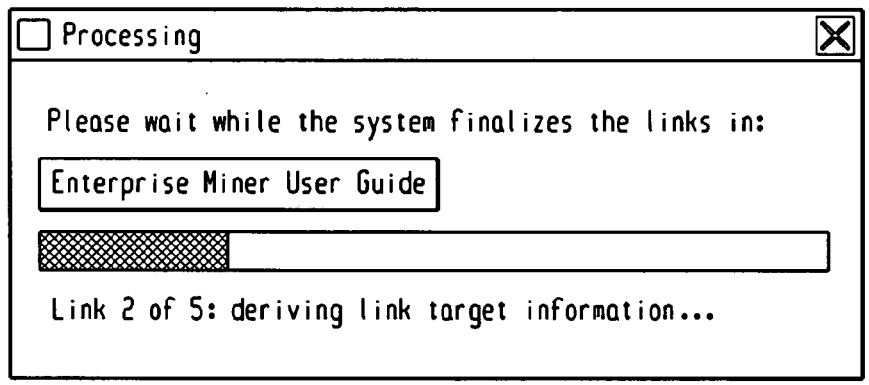
Figure 11:
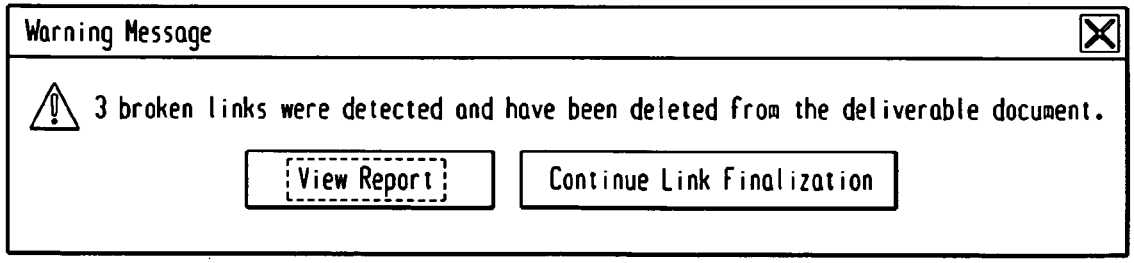
Figure 12:
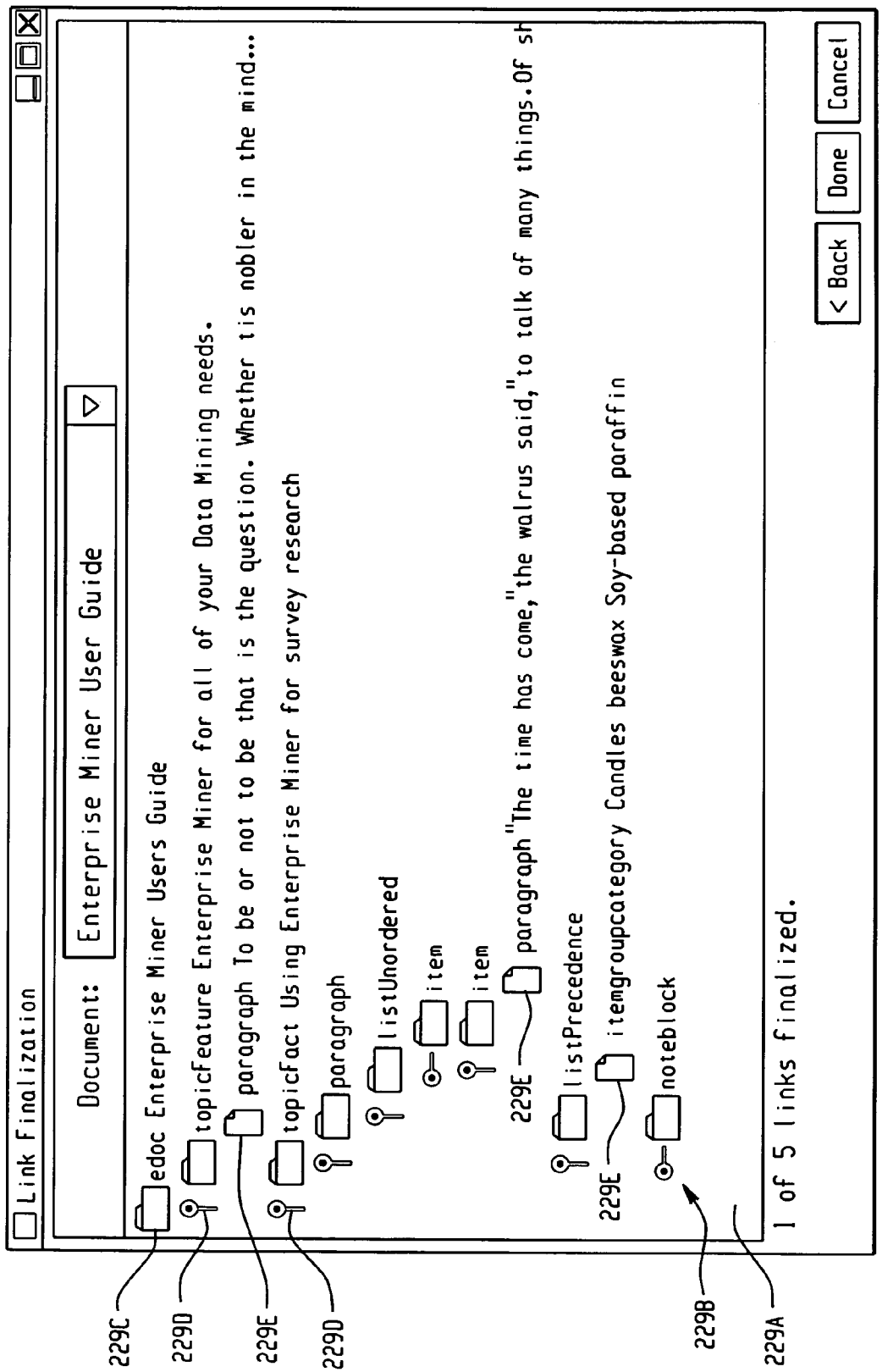

FIG. 10 shows an example of providing link finalization progress status indication to a user for processing in this example a software product user guide. FIG. 11 shows an example of a link finalization report, wherein three broken links were detected and have been deleted from the deliverable document. The user can view the broken link report by selecting the view report option button or the user can continue the link finalization process in order to produce the deliverable document by selecting the finalization button. If the user selects the view report option button, then a report appears that lists information for finding the source and target locations in the content development area. With reference to FIG. 12, interface 229A displays the hierarchy of the user guide at 229B. At the top of the hierarchy 229B, is the user guide document as indicated by icon 229C. The hierarchy 229B is expandable and collapsible as indicated by indicators 229D. The ambiguous links 229E are displayed to the user.

As mentioned above, the starting point for writing activities is the display of the modules in the XML editor and the display of links in the link control panel (e.g., FIGS. 7A and 7B at reference numerals 205, 207). Typically, the user performs many writing activities while working on one or more modules. Other actions that do not impact links (e.g., typing in text) may be performed at any time during the process, which illustrates that processing can be been designed to be independent of such contextual factors.

Actions can be categorized in two ways: direct actions and indirect actions. Direct actions specifically involve links, for example, when the user adds a new link or deletes an existing link. Indirect actions occur when the user modifies the XML content and the modification has ramifications for links. For instance, a user may delete a section of XML text, and a location (e.g., an XML tag) exists within the text that is used as a target of a link.

Figure 13:
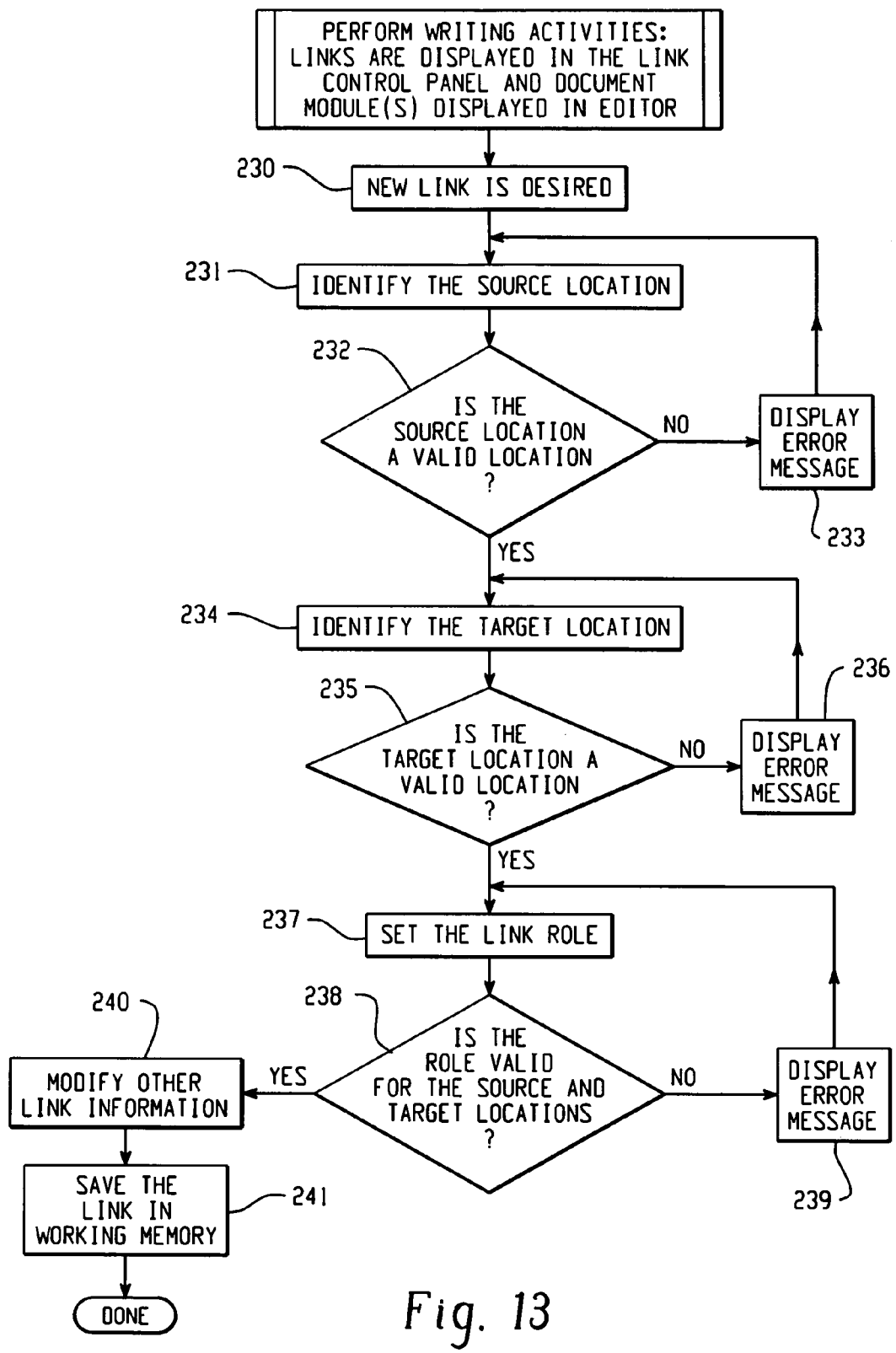
FIG. 13 is a flow chart depicting an operational scenario for editing a new link.

FIG. 13 depicts a process to add a new link. The user begins by identifying the need for a new link (230). First, the source location is identified (231). The user identifies the source location by placing the cursor at a specific XML tag in the XML editor window, and indicating that this is the source for a new link in the link control panel (e.g., by clicking a button in the user interface). The system checks that this location (tag) is a valid source location for a link (232). If not, an error message informs the user that the link source is invalid, and allows the user to choose another source location (233). Next, the target location is identified in a similar fashion (234). The system checks that this location is a valid target location for a link, including the source already chosen (235, 236). In the link control panel window, the user selects the role for the link using a predefined list of valid link roles (e.g., as displayed in a drop-down list in the user interface) (237). Once again, the system validates the link, this time checking that the combination of link source location, link target location and link role all are valid (238, 239). The user then modifies any other values associated with the link, such as the link title (240). The user saves the link (241) and the link is persisted in the session's working memory. The link is not stored permanently in the link database until a check in procedure is performed (as discussed later with respect to FIG. 18).

Figure 14:
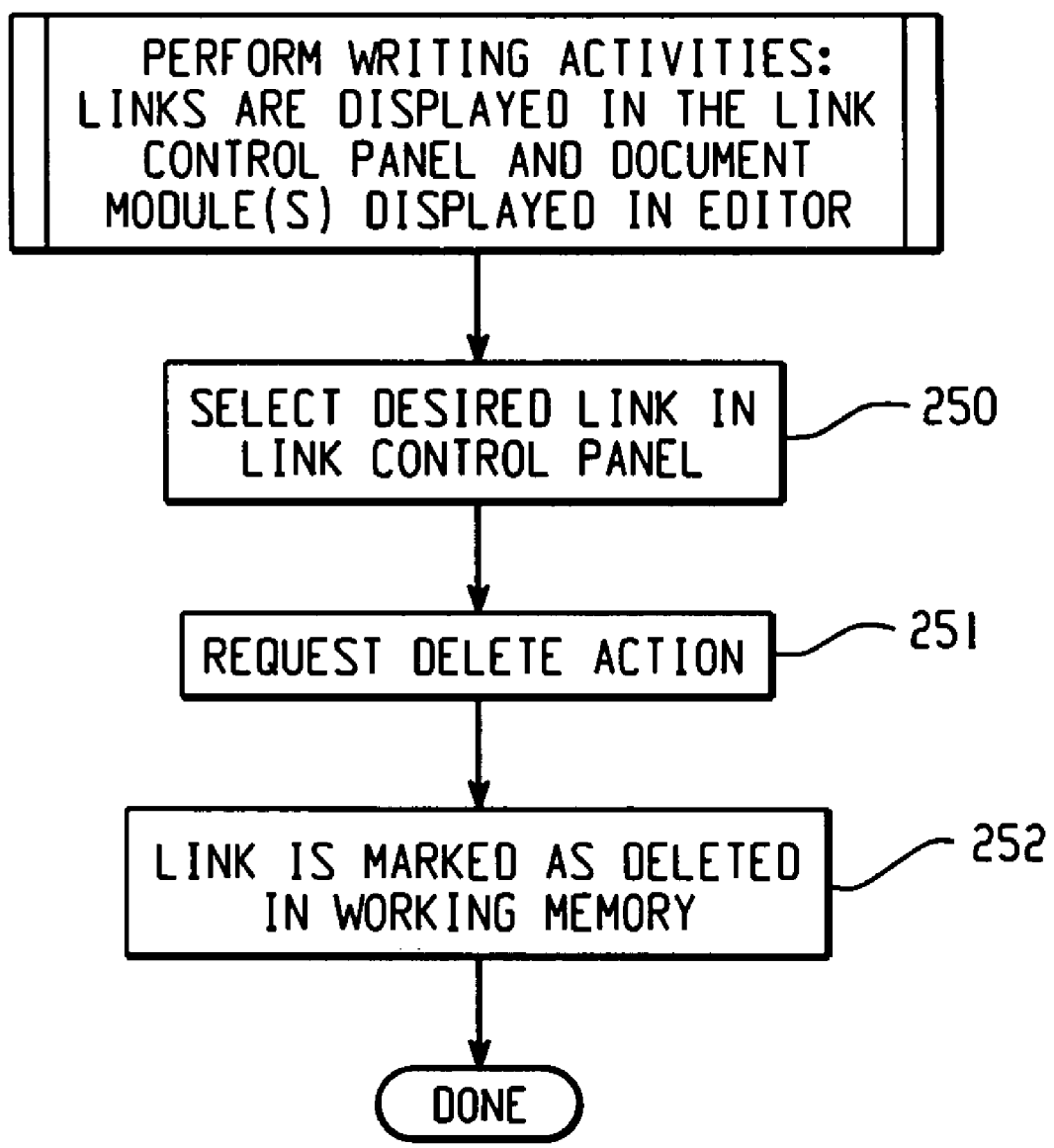
FIG. 14 is a flow chart depicting an operational scenario for deleting a link.

A process to delete a link is shown in FIG. 14. The user can see all links related to the document in the link control panel. The user selects the link of interest and views the attributes of this link in the link control panel window (250). The user initiates a delete action on the link (e.g., clicks a "Delete Button" in the user interface) (251) and the link is marked as deleted in the session's working memory (252). The delete becomes permanent when the check in action is performed (as discussed later with respect to FIG. 18).

Figure 15:
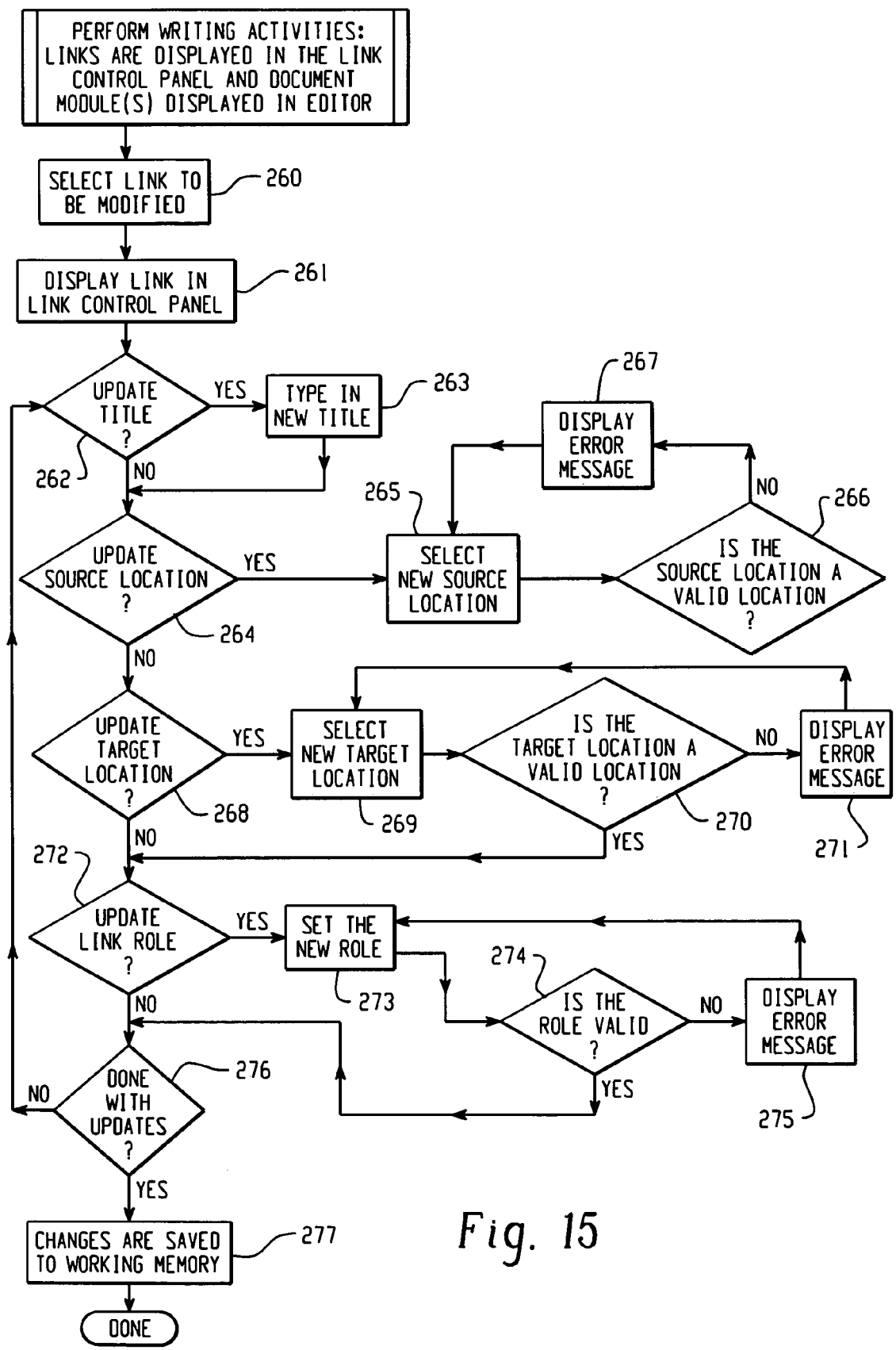
FIG. 15 is a flow chart depicting an operational scenario for modifying a link.

A process to modify a link is shown in FIG. 15. The user can see all links related to the document in the link control panel. The user selects the desired link and views the attributes of this link in the link control panel window (260, 261). The user then performs the desired editing actions.

If the user wishes to change the title of the link (or other text-based attributes of the link), the new values can be typed over the existing values in the link control panel window user interface (262, 263).

If the source location of the link is to be changed (264), the user selects the new source location in the XML editor window and places the cursor within that location. The user indicates that this is a new source location in the link control panel (e.g., by clicking a button) (265). The system verifies that the source location is a valid location for the existing target location and link role (266), and if it is not valid, it displays an error message, and allows the user to choose another new source location. If it is valid, the new source location is assigned.

If the target location of the link is to be changed (268), the user selects the new target location in the XML editor window and places the cursor within that location. The user indicates that this is a new target location in the link control panel (e.g., by clicking a button) (269). The system validates the target location for the existing source location and link role (270), and if it is not valid, displays an error message (271), and allows the user to choose another new target location. If the target location is valid, the new location is assigned as the target.

If the link role is to be changed (272), the user selects the new link role value from a list of valid values in the link control panel user interface. The system verifies that the new role is a valid value for the existing source and target locations (274). If it is not, an error message is displayed, and the user must choose a different role value (275). Otherwise, the new role value is assigned.

The user may continue to make any of these updates until all desired link modifications are made (276). When the user is done with the changes, the changes can be ignored or saved. If they are ignored, then any changes made are dropped, and the link is restored to its original state. When the changes are saved to working memory, the types of changes are analyzed and the following actions may take place:

If the source location and/or the target location have been changed, a new link can be created with the values set while performing modifications, and the original link can be marked as deleted.

If only the link role or title have been changed, the original link can be modified and this link is marked as modified.

As with the other direct actions, the changes are not stored permanently in the link database until a check in procedure is performed (as discussed later with respect to FIG. 18) unless otherwise configured.

The user may delete a section of text by any of several ways in the XML editor:

cut (e.g., Ctrl-x).

delete (e.g., pressing the delete key or backspace key).

selecting text and over typing.

selecting text and dragging it to a new location within the document (this is similar to a cut action followed by a paste action).

When the user deletes a section of content from an XML document in the editor, it is possible that the section deleted contains an XML tag that is used as a source location or a target location in one or more links. Furthermore, an implementation may lack the ability to detect all of these actions; this may be due to the capabilities of the XML editor and which functions it exposes via its API.

Figure 16:
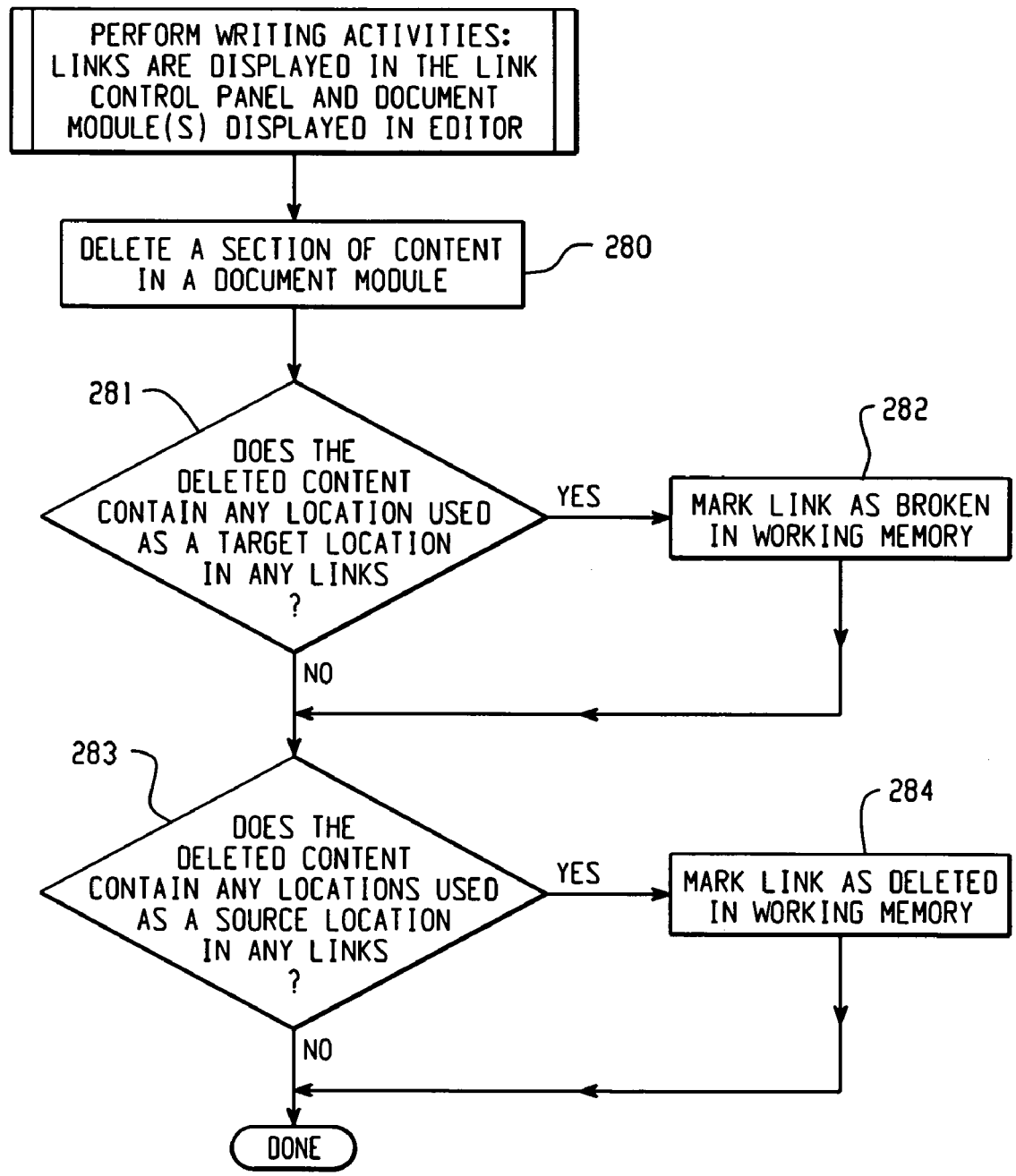
FIG. 16 is a flow chart depicting an operational scenario for deleting text.

A process to address changes when a section of text is deleted (and the delete is detected) from the XML editor window is shown in FIG. 16. The user initiates the delete action (280). Just before the delete action actually occurs, the system accesses the section of XML content to be deleted. It locates each potential link location within the XML by iterating through all the XML tags in the section. For each potential link location, it searches the list of links in working memory for the location ID as either a target location (281) or a source location (283). If a location is found to be a link target location, the link(s) that are defined with this location as their targets are marked as broken in working memory (282). If a location is found to be a link source location, the link(s) that are defined with this location as their sources are marked as deleted in working memory (284). After these procedures are complete, the delete action continues as normal.

If the source location and the target location are both located within the deleted text, the procedures for target and source locations described above will both be executed on the same link.

Further processing may be required on these links before they are saved permanently in the link database (as discussed later with respect to FIG. 18).

A common feature in text and document editing software is a "paste" action. This action occurs after the user has temporarily stored a section of content in a virtual holding area (typically called the "clipboard") and then requests for that text be inserted in a document at a specific location. Content is placed on the clipboard by either a copy action or a cut action. In the XML editor, the clipboard is likely to contain XML content, which may include locations that are used in links.

Figure 17:
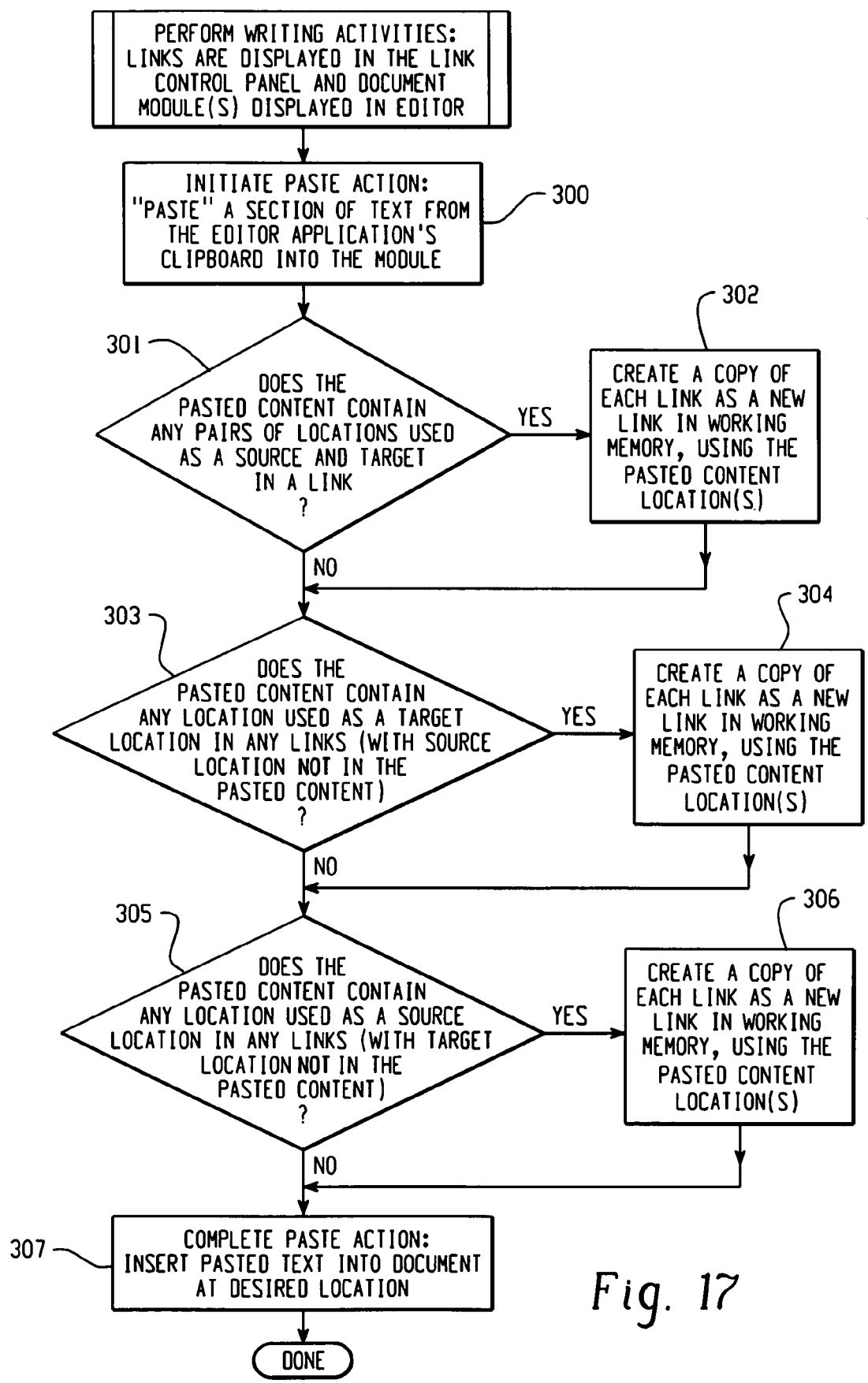
FIG. 17 is a flow chart depicting an operational scenario for pasting text.

A process to address changes when a section of text is pasted (and the paste action is detected) from the XML editor window is shown in FIG. 17. The user initiates the paste action (300). Before the paste action actually occurs, the system accesses the content to be inserted in the document, detects if it is XML content. If it is XML, the system searches for locations within it. Any location may be used in a link, and the system searches the list of links in working memory for the location ID as either a target location or a source location in a link. It first detects the special case of those links that have both source and target locations within the content to be pasted (301). If this is the case (302), for each such link, it may create a new link as a copy of the detected link. Next, it detects locations that are used as targets of links, in which the source locations of these links are not located within the content to be pasted (303). For these links, the system may create a copy of the link with the source location set the same as the original link, and the target location the location within the pasted text (304). Finally, the system detects locations that are used as source locations of links, in which the target locations are not located within the content to be pasted (305). The system may create a copy of each such link, with the source location as the location in the pasted content, and the target location the same as the original link (306).

When a system is configured to create new links, the status of all copied links is set to "new." Then, the final paste action completes, and the text is inserted as the user originally instructed (307). Further processing may be performed on these links before they are saved permanently in the link database (as discussed later with respect to FIG. 18).

An "undo" action is provided in most editor software. This feature allows the user to return the editor to a previous state by reversing actions the user performed. Since the user can undo actions that affect links, the undo action itself can address links as well.

In another example of the system, it is possible to support undo using well-documented techniques for implementing undo-redo stacks in interactive editing applications. A system can be designed to reassess any undetectable changes as a part of the check in procedure.

A check in procedure occurs when the user decides to commit the changes made during the editing session and save them permanently. Technically, the document is stored in the content management system as the next version. At the same time, the link database is permanently updated with the changes to links in working memory.

Figure 18:
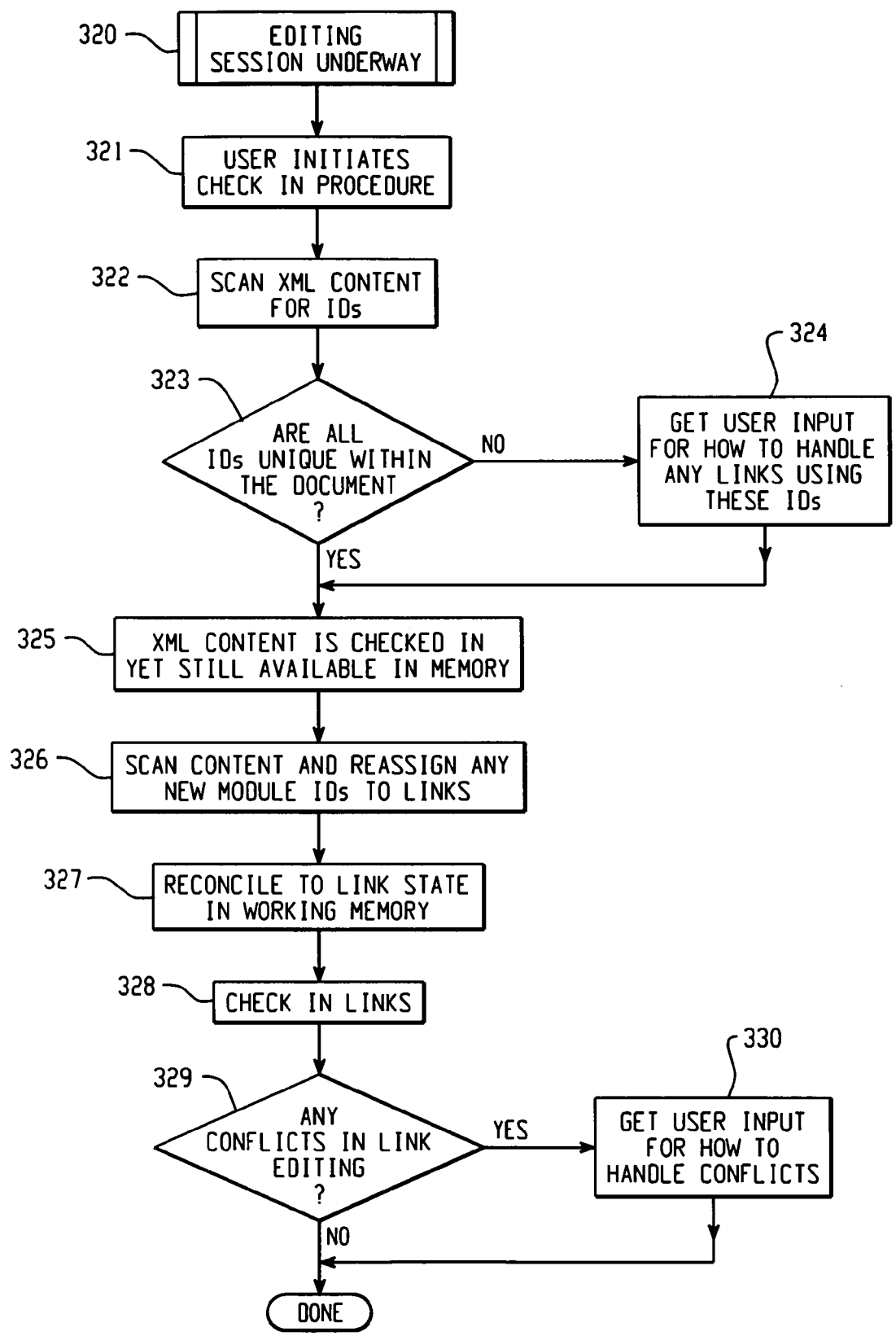
FIG. 18 is a flow chart depicting an operational scenario for a check in procedure.

A check in procedure is illustrated in FIG. 18. (This procedure is referenced in FIGS. 7A and 7B at reference numerals 212, 213, 216, 217.)

The editing session proceeds until the user decides to check in the document (320, 321). Indirect changes could also be handled at this point rather than dynamically during editing. The system scans the XML content of the document for any duplicate IDs (322). If any are found, the system will assign a new unique value to the ID attribute on the XML tag (323). However, this ID value may be used as a source or target resource in a link, and it may not be clear which location (of the duplicates) should actually be referenced in each link. The system can defer to the user, informing the user of the situation and taking input from the user to resolve the conflict (324).

Next, the system checks in the XML content (325) in the content management system. The check in procedure includes a step that breaks the XML content from the editing session into modules, if the system finds it should do so. After the check in procedure completes, the XML content can remain available in memory. The system scans the content again, looking for the new definitions of XML modules. If any are found, any links that reference locations within the new modules are updated to be consistent with the new module structure (326).

Following this step, the system checks the consistency of the links in working memory with the current state of the document (327). This procedure contains the logic to account for the undetected edit actions mentioned in the undo procedure discussed above. For example, suppose a new link is in working memory, and this link was created when the user pasted XML content during the editing session. The system checks that this link is still valid (e.g., that the source location and target location exist as specified in the link). If, for instance, the source location is not found, the system assumes that the user performed an undetected action that negated the creation of the link. The user could have done an "undo" immediately after the paste. Therefore, this link should not be saved permanently.

Once the valid links are confirmed and the invalid links are eliminated, the system stores the set of links associated with the modules that were just checked in (328). It examines the link status of each link in working memory and determines how to address the link. For example, if a link status is "deleted," the system locates the link and removes it from the link database; a status of "new" creates a new link in the link database. The check in process also detects multi-user conflicts—when another user has changed or deleted a link that this user is attempting to save (329). Again, the system can describe (330) the situation, and allowing the user to decide how to address the problem. When all such conflicts are resolved, the check in procedure is complete.

Figure 19:
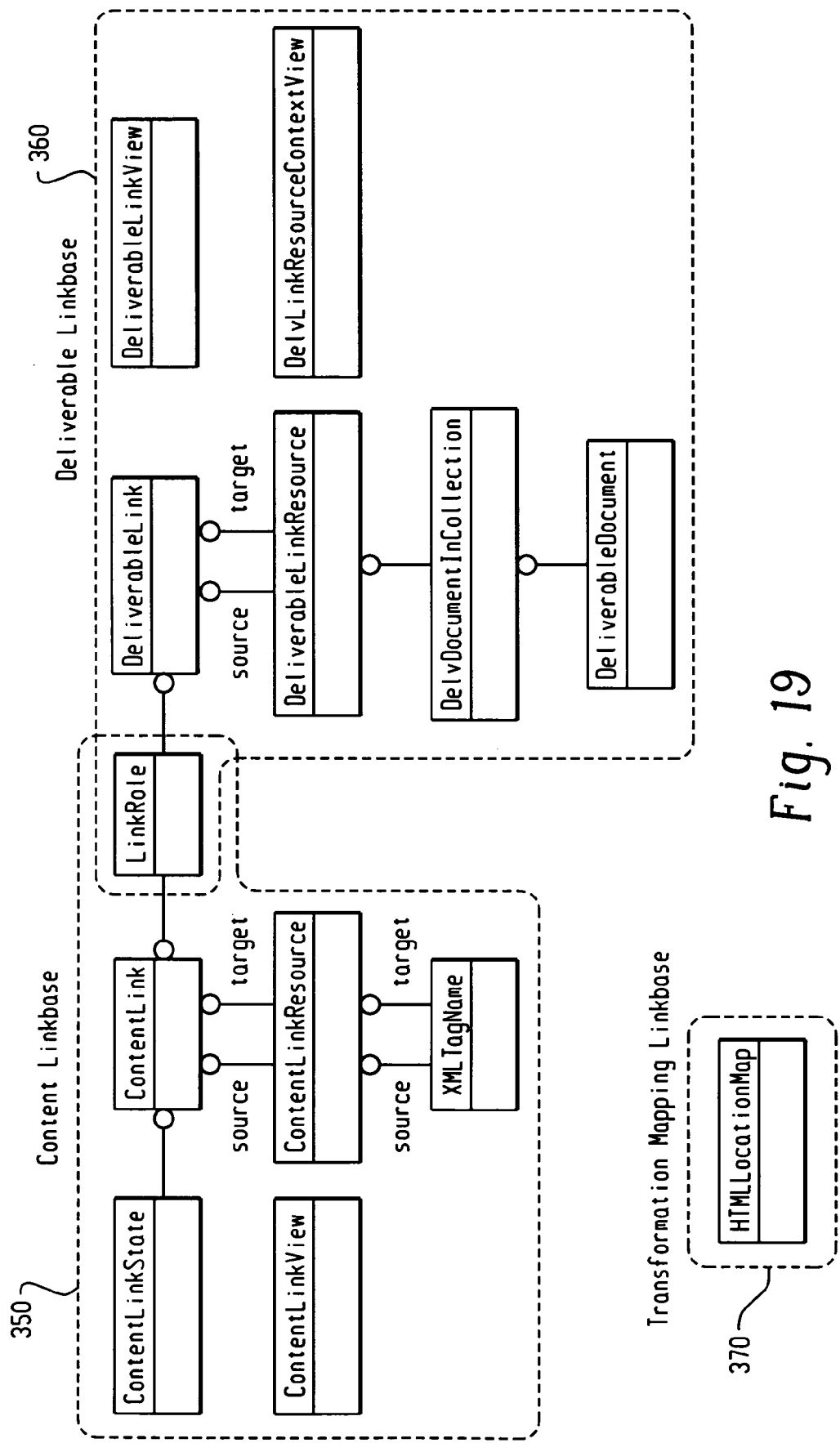
FIG. 19 is an entity relationship diagram illustrating an implementation of a link information data store.

As discussed above, link data can be stored in many different ways, such as in the format shown in FIG. 19. The links can be stored in a persistent, multi-user data store (e.g., a relational database) and an API allows other components to interact with it. As a separate subsystem, the link database provides access and maintenance to the links outside of the context of the documents that use the links. This allows the documents to exist with or without links, and it allows the links to be manipulated, processed and analyzed without having to access the XML documents.

The link database may be implemented in many different ways, such as in Oracle 8i as a relational database with a Java language API.

The link database's data model can include one or more components: the content link database 350, the deliverable link database 316, and the transformation mapping link database 370. An entity relationship diagram for a link database is shown in FIG. 19.

The content link database 350 can include tables and dynamic views that are used primarily during the authoring phase of a document development process. It includes tables for the link information, the link source and target locations, and link editing status. Generally, the users interact with this link database while they are authoring content, creating and editing links. The links in a link database exist within the context of the content domain.

A deliverable link database 360 may include tables and dynamic views that are used during the resolution and transformation phases of the document development process. The table structure can be similar to the content link database 350, and may involve a distinction in the context, that is the links in this link database exist in the context of the deliverable domain. In the data model, the deliverable collection entity reflects the context. Users interact with the deliverable link database 360 during document resolution. The links in this link database are derived from the links in the content link database 350.

A transformation mapping link database 370 may be a single table that aids in the mapping of link locations to actual file names during document transformation to HTML.

Other structures can be used to contribute to the efficiency and reliability of the database. For example, indexes speed access to database table rows. They are implemented on primary and secondary keys on the tables. Surrogate keys are used for primary keys of nearly all tables in the database. A surrogate key is a unique, random number for the primary key of a table. This may be done because links do not have a unique data value (or set of values) that could be used as a primary key. Sequences are automatic number generators used to create the surrogate primary key values. Constraints can be used to protect the integrity of the data. The link database implements primary key, null, uniqueness, and referential integrity constraints. Since the link database allows multi-user access, it is conceivable that two users would attempt to change the same link (or other data) at the same time. A link database can implement an optimistic locking scheme because although it is possible for users to update at the same time, it is unlikely. The database can be designed to detect when this happens and return an error to the software, and the system can decide how to handle the conflict. Triggers can also be used. Triggers run automatically when specific actions are taken. For example, when a new row is added to a table, a trigger runs to assign the surrogate key using the sequence. Stored procedures are small programs that perform actions that are integral to the integrity of the data. These two facilities are used for functionality that are to be performed quickly and reliably.

While examples have been used to disclose the invention, including the best mode, and also to enable any person skilled in the art to make and use the invention, the patentable scope of the invention is defined by claims, and may include other examples that occur to those skilled in the art.

As an example of the broad scope of the systems and methods disclosed herein, the content and release management process described on FIG. 6 at 154 may include the following. Content and release management is a process that enables the ongoing operation of the documentation development environment. Technical documentation is associated with a product (e.g., software), and that product is released for sale periodically over time. With each product release, the product's features change and improve. Accordingly, the documentation also changes; nevertheless, most of the product features remain the same. To minimize the amount of rework, the documentation for the new product release can be created from the old product release, and the content is modified as necessary. Links, as valuable information assets, could also be preserved from one release to the next. At times, an old product release is modified for such reasons as clarifying a point or correcting an error. Therefore, the publication system can allow for changes to old product releases. The corresponding linking data may also be allowed to change with the product.

A document module may be deleted when it is no longer used or if its content is redundant. When a document module is deleted, all links that have either a source or target resource within that module are deleted. If the content management system provides user ownership information of modules, the system can report the deletion of such links to interested users. Additionally, if the document module includes other document modules, the deletions must cascade through all included modules.

When new document modules are created for a new release of a document, the new modules can be assigned new module identifiers, and all the tags within the modules receive new tag identifiers. The links from the original modules are copied and associated with the corresponding new modules and tags in the new modules. There are three cases:

If both source and target resources of a link are within the modules, the link is copied and assigned new module and tag identifiers for the source and target. These identifiers correspond to the same content as the original links.

If the source resource of a link is within the modules but the target resource is not, the link is copied and the new link will have new source resource identifiers. The target resource will have the same identifiers as the original link.

If the target resource of a link is within the modules but the source resource is not, no action takes place.

Therefore, for each link with at least one resource within the modules being created for a new release, exactly zero or one link will be created. If the content management system provides user ownership information of modules, the system can report the link creation activity to the users so that they can take action if necessary.

The new links are marked as part of the new release and the original links remain available for changes if the old product release is modified.

Figure 20:
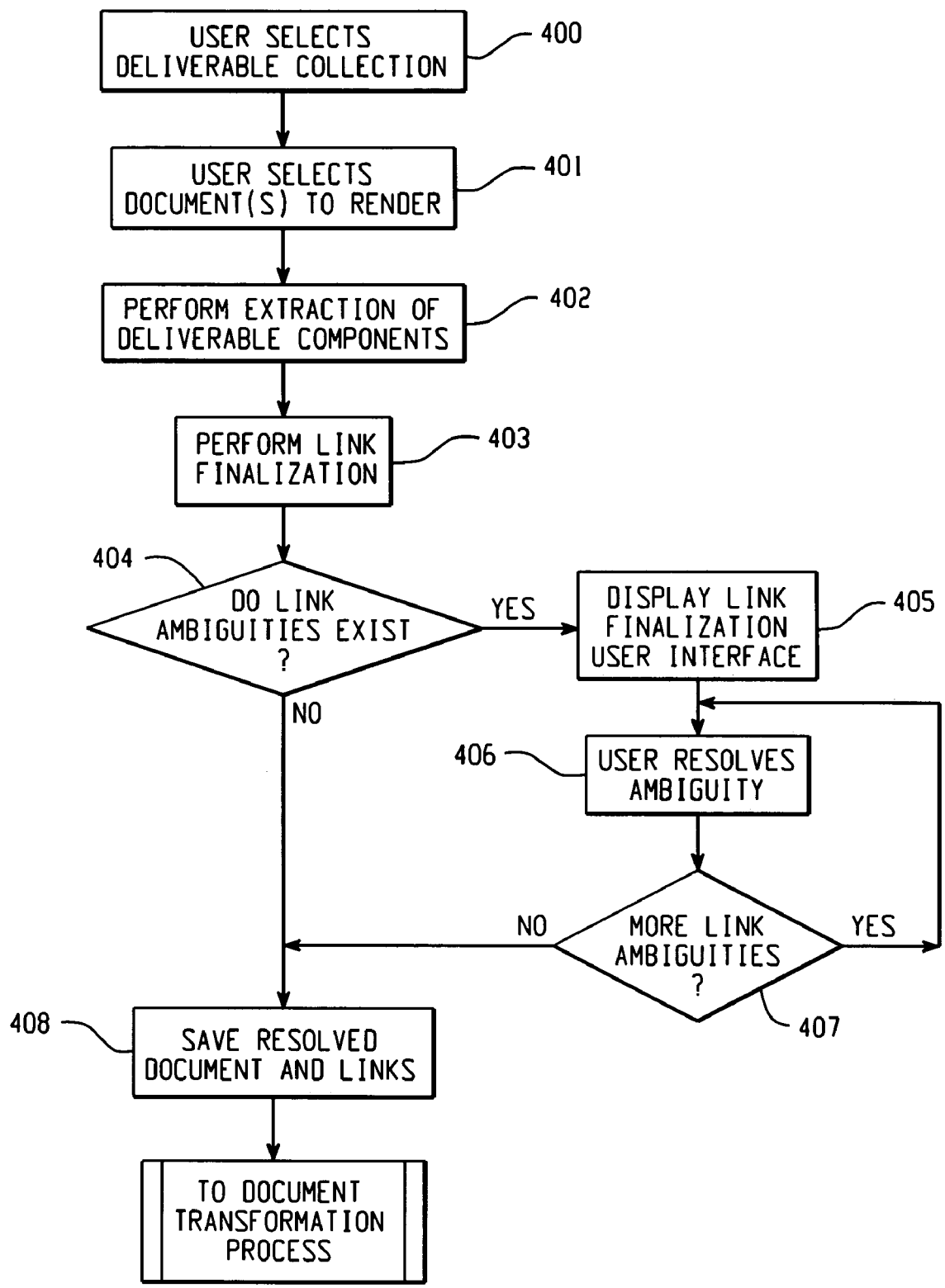
FIG. 20 is a flow chart depicting an operational scenario for a document resolution process.

A document resolution process (e.g., as shown at 158 on FIG. 6) can include initiating the process to render the documentation in a deliverable format, such as PostScript, PDF, or HTML. The documentation may be delivered to a customer via many different types of mechanisms, such as a network, a CD-ROM, etc. A process for document resolution is shown in FIG. 20. A user who is performing document resolution specifies what document(s) is/are to be produced. This is done by selecting the desired deliverable collection (400) and the documents within the collection (401). Next, the system begins its extraction and flattening process (402). This process gathers all of the modules in the desired documents, creates a copy of each one from the content management system and stores them locally. Because modules can include other modules, the flattening portion of this procedure includes the content of the modules to make a continuous stream of XML. This procedure effectively takes the "snapshot" of the content that will be used in the final document.

A link finalization process begins (403). A purpose of link finalization is to migrate the links from the authoring context to the deliverable context. The process ascertains that only valid links are migrated. During this process, all links that contain a source or target resource (or both) in any module in the document are examined for problems or ambiguities. The system addresses these issues in the following ways:

- If the link is not a valid link in the content link database (e.g., it has a status of "broken" or "incomplete"), it is not migrated to the delivery context. It will not appear in the final document.
- If one of the link resources (source or target) is in a module or document that is not a part of the deliverable collection, the link is not migrated to the delivery context. It is effectively removed from the final document.
- If the target location of a link is located in a module that has been included multiple times among the documents being resolved, an ambiguity exists (404).

If any ambiguities exist, the user can intervene to tell the process which instance is the correct one for the target of the link. The user can intervene via a link finalization user interface (405) to resolve the ambiguity (406). To help the user determine which is the appropriate link target, the interface can display all of the potential target locations for each module inclusion, and the user may choose the desired one. The user interacts with the system until all ambiguities are resolved (407).

Finally, the system saves the resolved document modules for use in the document transformation process. At the same time, the system saves the finalized links to the deliverable link database (408). Finalized links are derived from links in the content link database.

Resolving link ambiguities can potentially require much user involvement and time. A link manager can be configured to minimize this burden on the user by utilizing information from the previous link finalization process on the same document. When an ambiguity exists, the system checks for a previous version of the link in the deliverable link database. If one is found, it checks that the link is still valid for the current finalization process, and if so, it uses this prior information rather than requiring user intervention.

At the end of the link resolution process, each document can exist as an individual file, rather than as modules within the content management system. The deliverable link database is populated with the set of links for this transformation process.

The next step is document transformation, which proceeds after document resolution. Document transformation is a process in which the content tagged in XML is translated into a delivery format, such as PostScript, PDF, or HTML. It is also possible to transform the document into an intermediate format, such as a different XML tagging scheme. This process takes the document files and deliverable link database created by the document resolution process, and creates one or more files that are ready for delivery.

Document transformation can be accomplished in many ways, such as by using existing XML tools XSL-FO (Extensible Stylesheet Language Formatting Objects) and XSLT (XSL Transformations). XSL-FO is an XML vocabulary for specifying formatting semantics. As an illustration, after XML transformation, the results can be put through an XSL-FO engine for formatting. This adds information such as page geometry, page numbers, and table layouts and could be used to generate print hardcopy output.

These technologies use a stylesheet, which is a file containing a set of instructions specifying how to transform an XML tag into another format. For example, a stylesheet for XML to PostScript may specify that a <title> tag be transformed into 24-point bold, centered text in Times New Roman font. Similarly, a stylesheet for XML to HTML may specify that the same <title> tag be transformed into an HTML <h1> tag.

The transformation technology may include an API allowing a program to be called at certain points during its processing. In this example, whenever an XML tag is encountered that has an identification attribute, a program is invoked to determine if processing involving links is needed. The program interacts with the link database and provides information needed by the transformation process to include a link properly.

Figure 21:
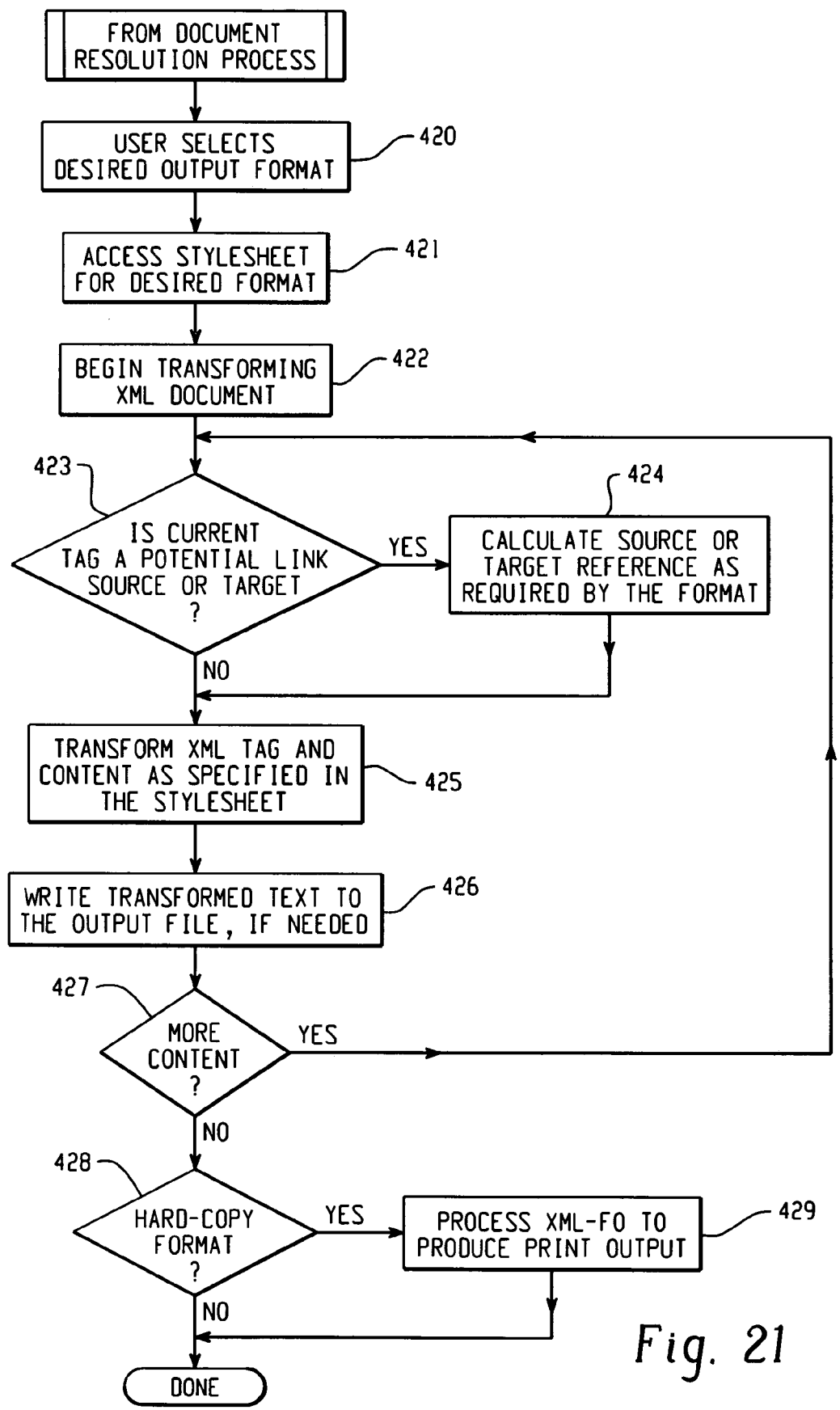
FIG. 21 is a flow chart depicting an operational scenario for document transformation process.

Such a process is illustrated in FIG. 21. The user selects the desired output format (420). The system locates the stylesheet for the desired format (421) and begins the process of transformation (422). When an XML tag is encountered that may be involved in a link, the system invokes the program via the XSLT API (424). Two situations are detected and addressed in the program as follows:

- The XML tag is a target of a link. This is detected by querying the deliverable link database for the tag's location identifier. The program calculates the appropriate formatting for the output format: for example, in HTML, the location value for the "name" attribute of the anchor tag; in a print format such as PostScript, no special calculation is needed at all, since link targets are not distinguished in printed text.
- The XML tag is a source of a link. This is also detected with a deliverable link database query. The program calculates the appropriate formatting for the output format as well. For instance, in HTML, the link database query would return the identification of the target location for the value of the "href" attribute on the anchor tag. Other information passed back could include the text of the link, used in a textual reference in a print document.

The XSLT processing accepts the information from the custom software and formats it appropriately, possibly including the tag content (425). Additionally, it is possible for a location to be involved in several links. The program and the XSLT processing can account for this possibility during formatting.

The formatted content may be written to a file immediately or it may be held in memory temporarily until it is appropriate to do so (426). This decision is guided by how the stylesheet specifies the link output format.

While there is still content to be transformed (427), the process continues; otherwise, transformation is complete. When complete, the system determines if the desired format (selected previously in item 420) is a hard-copy format (428), that is, the format is for printed material, such as a book. If it is, another processing step is required using XSL-FO. For hard-copy formats, the stylesheet chosen in step 421 may contain an intermediate markup instruction set for XSL-FO. The final processing step (429) interprets the intermediate instructions and performs the final formatting work to produce a file suitable for publishing in a book. For instance, the file is formatted for a particular paper size (8.5×11, A4, etc.) and includes headers, footers, page numbers, etc.

Additional processing may be done for documents being formatted in HTML. The input to this process can be the XML content per document and the deliverable link database. For print and intermediate format documents (e.g., PostScript, PDF, and XML), the output from this process can be the same content, only formatted. For HTML, a suite of files can be produced. The breakdown of the single XML file into many smaller HTML files is configurable and variable, as specified by the transformation process—an example might be one HTML file per chapter of a book. Since the file name is a part of the URI (Uniform Resource Identifier) specified in the "href" attribute of the anchor tag in HTML, the file names and the locations are kept track of within the files, as the system breaks up the XML file into smaller HTML files.

The transformation mapping link database includes a single table to provide the information for HTML transformation (e.g., see FIG. 19). The table is loaded in a preprocessing step, just before the transform begins. During preprocessing, the system parses the XML file and writes a record mapping the HTML file name to location identifiers for each potential link target location XML tag to the transformation mapping link database table. Then, during transformation, when a link source location is encountered (e.g., see FIG. 21 at reference numeral 424), the system performs an additional look up to determine the HTML file name of the link target for that source (425). Both the location and the file name are used to formulate the value for the "href" attribute of the anchor tag, thereby enabling the HTML links to work properly in the output. This information can be persisted for use in subsequent runs of the same transform for the same deliverable collection.

At the conclusion of the transformation process, one or several files are produced. The links are completely integrated in with the material as is appropriate for the format. The files can be used for the actual production of the document, such as printing, publishing, burning on a CD, etc.

As another example of the broad scope of the different systems and methods discussed herein, the system and methods can keep links valid throughout the entire process, thus preserving the investment in their creation and the value they add to the documentation product. The management of links is automated throughout the documentation development. By automating processes, the cost of maintaining documents and links is reduced, and people are freed from performing the tedious and redundant work of fixing problems with links. Also, the quality of links is improved that exist in the final documents. The automated processes contribute to this effort, because they are able to detect problems with links as they occur, and allow writers and editors to address the problems directly. The result is a document collection containing the intended links and with those links working as expected.

It is further noted that the systems and methods may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed as the invention:

1. A computer-implemented apparatus for handling document content, wherein a subset of the document content is defined, said apparatus comprising:
   a link data store that stores data about links between document content;
   a link manager connected to the link data store;
   said link manager accessing said stored link data for use in identifying and resolving one or more links broken because of the defining of the document subset.

2. The apparatus of claim 1, wherein the links are cross-reference links between the document content.

3. The apparatus of claim 1, wherein a first link between first document content and second document content becomes broken because the second document content is not included in the document content subset.

4. The apparatus of claim 1, wherein a broken link includes a link that references document content not present in the document content subset.

5. The apparatus of claim 1, wherein a first link exists between first document content and second document content,
   wherein multiple versions exist for the second document content;
   wherein the first link becomes broken because a version of the second document content is not included in the document content subset.

6. The apparatus of claim 5, wherein the link data store stores which document content version is linked to which target document content version.

7. The apparatus of claim 1, wherein the link data store stores which document content contains links to which target document content.

8. The apparatus of claim 1, wherein the data store is a repository for storing link information which is stored separately and independently from storage of the document content.

9. The apparatus of claim 1, wherein the data store is a database;
   wherein the link database is based upon a data model for encapsulating and storing links persistently;
   wherein the document content is stored as eXtensible Markup Language (XML) documents;
   wherein the links are stored in the database and not within the XML documents.

10. The apparatus of claim 1, wherein the data store is a database;
   wherein the link data store is based upon a data model for encapsulating and storing links persistently;
   wherein the document content is stored as eXtensible Markup Language (XML) documents;
   wherein the links are stored in the database and stored separately within the XML documents.

11. The apparatus of claim 1, wherein the links are cross-reference hyperlinks that include a starting point, an ending point, and a direction.

12. The apparatus of claim 1, wherein the link manager is involved in handling links created during a document content authoring process.

13. The apparatus of claim 12, wherein during the authoring step, the link manager detects which links are impacted by an editing change to text in a document content portion;
   wherein the link manager is configured to automatically adjust a link to account for the editing change;
   wherein the link manager is configured to inform a user of a problem with a link because of the editing change.

14. The apparatus of claim 13, wherein when the final documentation product is to be produced, the link manager is configured to interpret the structure of the document in context of the document subset, to ensure that links are valid in the documentation subset product.

15. The apparatus of claim 13, wherein the link manager is configured to automatically detect invalid links and remove them;
   wherein when ambiguities are detected in links, the link manager notifies the user and provide a set of choices to address the ambiguity.

16. The apparatus of claim 15, wherein the link manager is configured to handle direct actions and indirect actions performed by a user with respect to document content.

17. The apparatus of claim 16, wherein a direct action affects a link associated with the document content.

18. The apparatus of claim 16, wherein an indirect action affects a link associated with the document content.

19. The apparatus of claim 1, wherein the data store comprises rules for handling links.

20. The apparatus of claim 19, wherein the rules are based upon factors, wherein the factors include document structure and the role of the link.

21. The apparatus of claim 20, wherein the link manager is configured to periodically access the link data store in order to recheck the validity of links with respect to the rules.

22. The apparatus of claim 1, wherein the defined document subset undergoes document resolution and document transformation before a product containing the defined document subset is provided to a customer.

23. The apparatus of claim 22, wherein the product is provided to the customer in a format selected from the group consisting of HTML, PDF, hardcopy, and combinations thereof.

24. The apparatus of claim 23, wherein the links contained within the product are not broken.

25. A computer-implemented method for handling documents, said method comprising:
   storing data about links between document content;
   defining a subset of the document content;
   examining a link to determine whether the link is broken due to the definition of the document content subset;
   wherein an identified broken link is resolved before delivery of the document content subset product.

26. The method of claim 25, wherein the links are cross-reference links between the document content.

27. The method of claim 25, wherein a first link between a first document content and a second document content becomes broken because the second document content is not included in the document content subset.

28. The method of claim 25, wherein a broken link includes a link that references document content not present in the document content subset.

29. The method of claim 25, wherein a first link exists between first document content and second document content,
   wherein multiple versions exist for the second document content;
   wherein the first link becomes broken because a version of the second document content is not included in the document content subset.

30. The method of claim 29, further comprising using a link data store to store which document content version is linked to which target document content version.

31. The method of claim 25, further comprising using a link data store to store which document content contains links to which target document content.

32. The method of claim 25, further comprising using a data store to store link information separately and independently from storage of the document content.

33. The method of claim 25, further comprising using a link database,
   wherein the link database is based upon a data model for encapsulating and storing links persistently;
   wherein the document content is stored as eXtensible Markup Language (XML) documents;
   wherein the links are stored in the link database and not within the XML documents.

34. The method of claim 25, further comprising using a link data store wherein the link data store is a database;
   wherein the link data store is based upon a data model for encapsulating and storing links persistently;
   wherein the document content is stored as eXtensible Markup Language (XML) documents;
   wherein the links are stored in the database and are stored separately within the XML documents.

35. The method of claim 25, wherein the links are cross-reference hyperlinks that include a starting point, an ending point, and a direction.

36. The method of claim 25, further comprising a link manager to handle links created during a document content authoring process.

37. The method of claim 36, wherein during the authoring step, the link manager detects which links are impacted by an editing change to text in a document content portion;
   wherein the link manager is configured to automatically adjust a link to account for the editing change;
   wherein the link manager is configured to inform a user of a problem with a link because of the editing change.

38. The method of claim 37, wherein when a final documentation product is to be produced, the link manager is configured to interpret the structure of the document in context of the document subset to ensure that links are valid in the documentation subset product.

39. The method of claim 37, wherein the link manager is configured to automatically detect invalid links and remove them;
   wherein when ambiguities are detected in links, the link manager notifies the user and provide a set of choices to address the ambiguity.

40. The method of claim 39, wherein the link manager is configured to handle direct actions and indirect actions performed by a user with respect to document content.

41. The method of claim 40, wherein a direct action affects a link associated with the document content.

42. The method of claim 40, wherein an indirect action affects a link associated with the document content.

43. The method of claim 25, further comprising using rules to handling links.

44. The method of claim 43, wherein the rules are based upon factors, wherein the factors include document structure and the role of the link.

45. The method of claim 44, further comprising a link manager and a link data store;
wherein the link manager is configured to periodically access the link data store in order to recheck the validity of links with respect to the rules.

46. The method of claim 25, wherein the document content subset undergoes document resolution and document transformation before a product containing the document content subset is provided to a customer.

47. The method of claim 46, wherein the product is provided to the customer in a format selected from the group consisting of HTML, PDF, hardcopy, and combinations thereof.

48. The method of claim 47, wherein the links contained within the product are not broken.

49. A computer-implemented system for handling documents, said system comprising:
means for storing data about links between document content;
means for defining a subset of the document content;
means for examining a link to determine whether the link is broken due to the definition of the document content subset;
wherein an identified broken link is resolved before delivery of the document content subset product.

50. A computer-readable storage medium capable of causing a computing device to perform a method for handling documents, said method comprising:
storing data about links between document content;
defining a subset of the document content;
examining a link to determine whether the link is broken due to the definition of the document content subset;
wherein an identified broken link is resolved before delivery of the document content subset product.

* * * * *